US012523176B2

(12) United States Patent
Ertas et al.

(10) Patent No.: US 12,523,176 B2
(45) Date of Patent: Jan. 13, 2026

(54) GEARBOX ASSEMBLY WITH LUBRICANT EXTRACTION VOLUME RATIO

(71) Applicants: General Electric Company, Evendale, OH (US); GE Avio S.r.l., Rivalta di Torino (IT)

(72) Inventors: Bugra H. Ertas, Niskayuna, NY (US); Xiaohua Zhang, Glenville, NY (US); Miriam Manzoni, Rivalta di Torino (IT); Flavia Turi, Bari (IT); Andrea Piazza, Turin (IT); Arthur W. Sibbach, Boxford, MA (US)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/972,209

(22) Filed: Dec. 6, 2024

(65) Prior Publication Data
US 2025/0101911 A1   Mar. 27, 2025

Related U.S. Application Data

(63) Continuation-in-part of application No. 18/068,017, filed on Dec. 19, 2022.

(30) Foreign Application Priority Data

Jun. 22, 2022   (IT) .................. 102022000013213

(51) Int. Cl.
*F02C 7/36* (2006.01)
*F01D 25/18* (2006.01)
(Continued)

(52) U.S. Cl.
CPC ............... *F02C 7/36* (2013.01); *F01D 25/18* (2013.01); *F02C 7/06* (2013.01); *F16H 57/0434* (2013.01);
(Continued)

(58) Field of Classification Search
None
See application file for complete search history.

(56) References Cited

U.S. PATENT DOCUMENTS 2,479,766 A * 8/1949 Mulvany .................. E03B 3/28
                                                                96/111
5,896,740 A    4/1999 Shouman
(Continued)

FOREIGN PATENT DOCUMENTS

EP    2148114 A1    1/2010
EP    2980368 A1    2/2016
(Continued)

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

(Continued)

*Primary Examiner* — Gerald L Sung
*Assistant Examiner* — Jacek Lisowski
(74) *Attorney, Agent, or Firm* — Venable LLP; Peter T. Hrubiec; Michele V. Frank

(57) ABSTRACT

A gas turbine engine includes a fan, a combustor positioned in a core air flowpath that generates combustion gases, a steam system that extracts water from the combustion gases and generates steam, and a gearbox assembly. The steam system includes water storage devices that store the water therein. The water storage devices include a first state in which a level of the water increases or is maintained and a second state in which the level of the water decreases as the water flows through the water storage devices. The gearbox (Continued)

assembly includes a gearbox and a gutter for collecting a gearbox lubricant scavenge flow from the gearbox. The gutter is characterized by a lubricant extraction volume ratio between 0.01 and 0.3, inclusive of the endpoints. The lubricant extraction volume ratio defined by:

$$\frac{V_G}{V_{GB}} \cdot V_G$$

is a gutter volume of the gutter and $V_{GB}$ is a gearbox volume.

20 Claims, 8 Drawing Sheets

(51) Int. Cl.
  F02C 7/06 (2006.01)
  F16H 57/04 (2010.01)
(52) U.S. Cl.
  CPC .... F05D 2260/606 (2013.01); F05D 2260/98 (2013.01); F05D 2270/16 (2013.01)

(56) References Cited

U.S. PATENT DOCUMENTS

| | | |
|---|---|---|
| 6,983,605 B1 | 1/2006 | Hook et al. |
| 8,151,549 B2 | 4/2012 | Sasaki et al. |
| 8,215,454 B2 * | 7/2012 | Portlock .................. F02C 7/36 184/6.12 |
| 8,516,809 B2 * | 8/2013 | Fong ...................... F04B 39/06 60/370 |
| 8,631,656 B2 | 1/2014 | Danis et al. |
| 8,826,671 B2 | 9/2014 | Kim et al. |
| 8,950,191 B2 | 2/2015 | Landis et al. |
| 9,404,420 B2 | 8/2016 | Gallet et al. |
| 9,464,573 B2 | 10/2016 | Remy et al. |
| 9,790,804 B2 | 10/2017 | Lepretre |
| 10,041,417 B2 | 8/2018 | Horikawa et al. |
| 10,082,105 B2 | 9/2018 | McCune et al. |
| 10,247,020 B2 | 4/2019 | McCune |
| 10,287,915 B2 | 5/2019 | McCune |
| 10,364,881 B2 | 7/2019 | Pikovsky et al. |
| 10,605,351 B2 | 3/2020 | Sheridan et al. |
| 11,060,417 B2 | 7/2021 | McCune |
| 11,066,945 B2 | 7/2021 | McCune |
| 11,203,974 B2 | 12/2021 | Sheridan |
| 11,236,637 B2 | 2/2022 | Parnin et al. |
| 11,268,453 B1 | 3/2022 | Desjardins et al. |
| 11,339,725 B2 | 5/2022 | Simon et al. |
| 11,603,798 B1 | 3/2023 | Terwilliger et al. |
| 11,719,127 B2 | 8/2023 | Davis et al. |
| 11,808,209 B1 | 11/2023 | Sobanski |
| 11,920,515 B2 | 3/2024 | Alahyari |
| 2008/0110417 A1 | 5/2008 | Smith |
| 2013/0319006 A1 | 12/2013 | Parnin et al. |
| 2015/0089918 A1 | 4/2015 | Valva et al. |
| 2015/0267618 A1 | 9/2015 | Schwarz et al. |
| 2016/0032773 A1 | 2/2016 | James et al. |
| 2016/0289575 A1 * | 10/2016 | Brenize ............... B01D 19/0063 |
| 2017/0051823 A1 | 2/2017 | Pikovsky et al. |
| 2017/0108110 A1 | 4/2017 | Sheridan |
| 2017/0356663 A1 | 12/2017 | Couperthwaite et al. |
| 2019/0113127 A1 | 4/2019 | Gravina |
| 2019/0170004 A1 | 6/2019 | McCune |
| 2019/0271236 A1 | 9/2019 | McCune |
| 2019/0323597 A1 | 10/2019 | Sheridan |
| 2020/0165980 A1 | 5/2020 | Di Giovanni |
| 2020/0200042 A1 | 6/2020 | Charrier et al. |
| 2021/0017910 A1 | 1/2021 | Spruce |
| 2021/0148453 A1 | 5/2021 | Pennacino et al. |
| 2021/0189904 A1 * | 6/2021 | Kracum .................. F01D 25/08 |
| 2021/0222767 A1 | 7/2021 | Jabido et al. |
| 2021/0324762 A1 | 10/2021 | Anglin et al. |
| 2022/0316584 A1 | 10/2022 | Jacquemard et al. |
| 2022/0397040 A1 | 12/2022 | Molesini et al. |
| 2023/0021913 A1 | 1/2023 | Levisse et al. |
| 2023/0286661 A1 | 9/2023 | Klingels |
| 2023/0407768 A1 | 12/2023 | Staubach |

FOREIGN PATENT DOCUMENTS

| | | |
|---|---|---|
| EP | 2855859 B1 | 1/2019 |
| FR | 3127024 A1 | 3/2023 |
| FR | 3127025 A1 | 3/2023 |
| FR | 3127269 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| FR | 3130896 A1 | 6/2023 |
| FR | 3130897 A1 | 6/2023 |
| FR | 3133367 A1 | 9/2023 |
| FR | 3133368 A1 | 9/2023 |
| JP | H08232680 A | 9/1996 |
| WO | 2015147949 A2 | 10/2015 |

OTHER PUBLICATIONS

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

Slides from Sustainable Water-Injecting Turbofan Comprising Hybrid-Electrics (SWITCH) Introduction at the 2023 NPSS Annual Consortium Meeting, Mar. 10, 2023.

* cited by examiner

GEARBOX ASSEMBLY WITH LUBRICANT EXTRACTION VOLUME RATIO

CROSS REFERENCE TO RELATED APPLICATIONS

The present application is a continuation-in-part application of U.S. patent application Ser. No. 18/068,017, filed Dec. 19, 2022, which claims the benefit of Italian Patent Application No. 102022000013213, filed on Jun. 22, 2022, the entire contents of which are incorporated by reference in their entireties.

TECHNICAL FIELD

The present disclosure relates to a gearbox assembly for an engine, for example, a gas turbine engine for an aircraft.

BACKGROUND

Lubricant is used in a power gearbox to lubricate gears and rotating parts in the gearbox. Lubricant may be supplied to lubricate the mesh between the gears. As the gears of the gearbox assembly rotate during operation, the lubricant is expelled outwardly. The lubricant is captured by a gutter.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
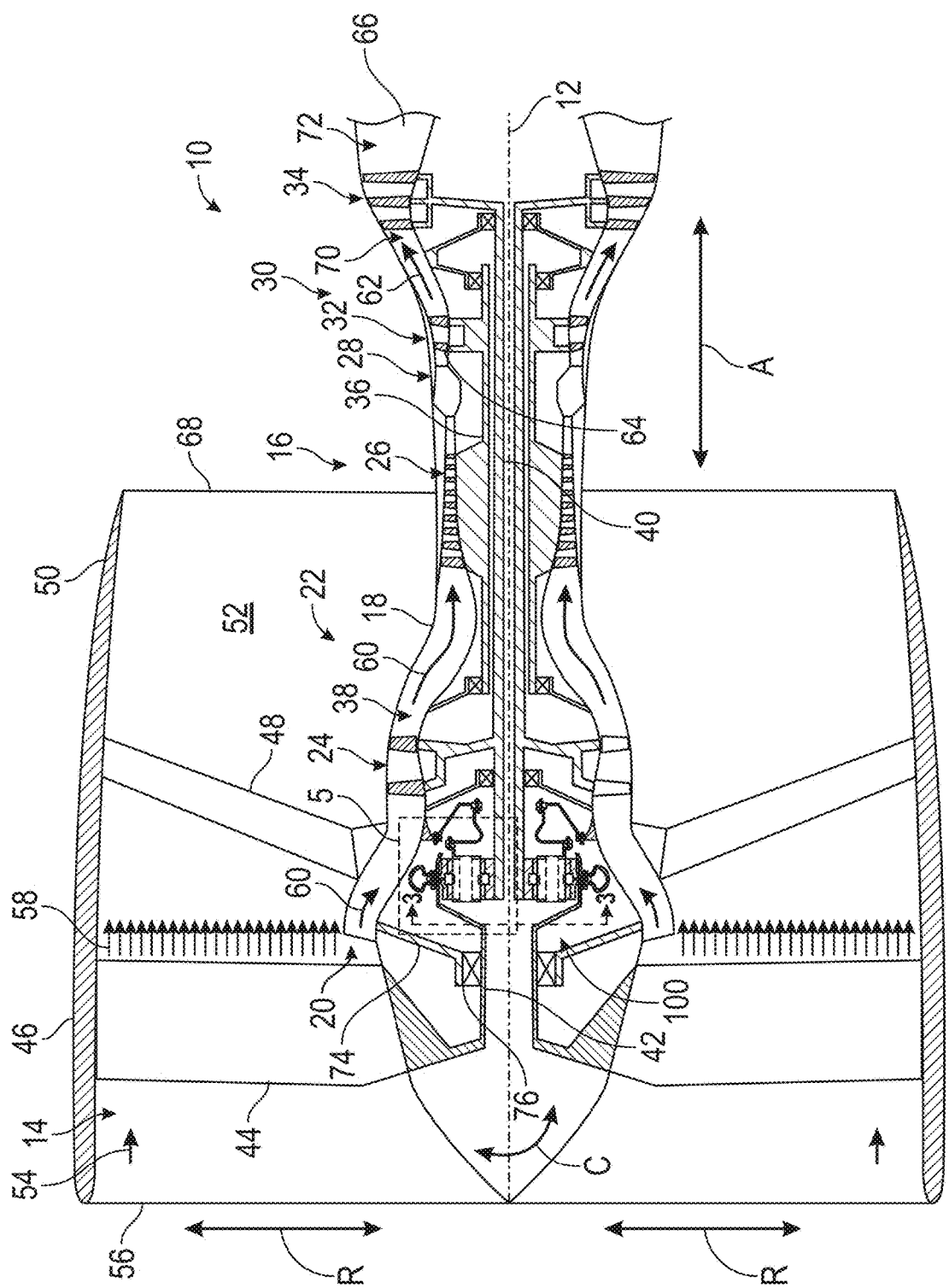
FIG. 1 illustrates a schematic, cross-sectional view of an engine, taken along a centerline axis of the engine, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, "steady state" operating conditions of a gas turbine engine are operating conditions of the gas turbine engine in which a level of the operating conditions is substantially constant (e.g., not increasing or decreasing). Steady state operating conditions typically occur when the gas turbine engine is operating at idle conditions, takeoff conditions, or cruise conditions. During steady state operating conditions, a throttle position for the gas turbine engine remains stable or unchanged.

As used herein, "transient operating conditions" of the gas turbine engine are operating conditions in which a level of the operating conditions is increasing or decreasing. Transient operating conditions typically occur when the gas turbine engine is accelerating or decelerating between the idle conditions, the takeoff conditions, or the cruise conditions. The transient operating conditions are typically in response to a change of the throttle position for the gas turbine engine.

As used herein, a "bypass ratio" of a gas turbine engine is a ratio of bypass air through a bypass of the gas turbine engine to core air through a core inlet of a core turbine engine of the gas turbine engine. For example, the bypass ratio is a ratio of bypass air (also referred to as bypass airflow) entering the bypass airflow passage to core air (also referred to as core airflow) entering the turbo-engine (also referred to as a core engine).

As used herein, a "compression ratio" of a compressor is a ratio of a compressor exit pressure at an exit of the compressor to a compressor inlet pressure at an inlet of the compressor. The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine can be configured as a geared engine. Geared engines include a power gearbox utilized to transfer power from a turbine shaft to a fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from a turbine shaft operating at a first speed to a fan shaft rotating at a second, lower speed. For a planet configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft.

In either configuration, it is desired to increase efficiency. There are several effects that can negatively impact a gearbox's efficiency. For example, gearboxes experience windage across rotating components (e.g., in the bearing, in rolling surfaces, in the gears), that is, shear and drag forces are generated across the gears, pins, and bearings of the gearboxes. In another example, the rotating components of the gearbox experience friction losses due to the relative rotation between components. The windage and friction losses reduce the efficiency of the gearbox. In addition to reducing efficiency, windage and friction losses contribute to heat generation in gearboxes. The relative rotating surfaces and force transmission between the gears also generates heat in the gearboxes.

When a gearbox operates at higher efficiency a greater percentage of the input power from the LP shaft is transferred to the fan shaft. To improve gearbox efficiency, lubrication is provided to the gearboxes to provide a protective film at the rolling contact surfaces, to lubricate the components, and to remove heat from the gearbox. Lubrication supplied to the gearbox, however, needs to be removed from the gearbox. Buildup of lubrication in the gearbox may reduce efficiency and may not remove the heat from the gearbox. Furthermore, allowing the lubrication in the gearbox to enter other components of the engine may negatively impact operation of the other components. One way to remove lubrication from the gearbox is to scavenge the lubrication through a gutter. The gutter collects lubricant expelled from the gearbox during operation. Gutters are often designed to circumscribe the ring gear, without taking into account the requirements of the engine or the gearbox. This results in gutters that are too large or too small. A gutter that is larger than required for the engine takes up valuable space in the engine, adding weight to the engine and decreasing overall engine efficiency. A gutter that is smaller than required for the engine may not properly scavenge the lubricant from the gearbox, allowing leakage from the gutter and reducing the ability of the lubricant to remove heat from the gearbox. The inventors, seeking ways to improve upon existing gutters in terms of their size/capacity for particular architectures, gearbox types and/or mission requirements, tested different gutter configurations to ascertain what factors play into an appropriate gutter sizing.

FIG. 1 illustrates a schematic, cross-sectional view of an engine 10. The engine 10 may be, for example, but not limited to, a turbine engine, such as a gas turbine engine. The engine 10 defines an axial direction A extending parallel to a longitudinal, engine centerline 12, also referred to as a longitudinal centerline axis, a radial direction R that is normal to the axial direction A, and a circumferential direction C about the engine centerline 12 (shown in/out of the page in FIG. 1). The engine 10 includes a fan section 14 and a core engine 16 downstream from the fan section 14.

The core engine 16 includes a core engine casing 18 that is substantially tubular and defines an annular inlet 20. The core engine casing 18 encases, in serial flow relationship, a compressor section 22 including a low-pressure compressor 24, also referred to as a booster 24, followed downstream by a high-pressure compressor 26, a combustion section 28, a turbine section 30 including a high-pressure turbine 32 followed downstream by a low-pressure turbine 34, and a jet exhaust nozzle section 72 downstream of the low-pressure turbine 34. A high-pressure shaft 36 drivingly connects the high-pressure turbine 32 to the high-pressure compressor 26 to rotate the high-pressure turbine 32 and the high-pressure compressor 26 in unison. The compressor section 22, the combustion section 28, the turbine section 30 together define a core air flowpath 38 extending from the annular inlet 20 to the jet exhaust nozzle section 72.

A low-pressure shaft 40 drivingly connects the low-pressure turbine 34 to the booster 24 to rotate the low-pressure turbine 34 and the booster 24 in unison. A gearbox assembly 100 couples the low-pressure shaft 40 to a fan shaft 42 to drive fan blades 44 of the fan section 14. The fan shaft 42 is coupled to a fan frame 74 via a bearing 76. The fan blades 44 extend radially outward from the engine centerline 12 in the direction R. The fan blades 44 rotate about the engine centerline 12 via the fan shaft 42 that is powered by the low-pressure shaft 40 across the gearbox assembly 100. The gearbox assembly 100 adjusts the rotational speed of the fan shaft 42 and, thus, the fan blades 44 relative to the low-pressure shaft 40. That is, the gearbox assembly 100 is a reduction gearbox and power gearbox that delivers a torque from the low-pressure shaft 40 running at a first speed, to the fan shaft 42 coupled to fan blades 44 running at a second, slower speed.

In FIG. 1, the fan section 14 includes an annular fan casing or a nacelle 46 that circumferentially surrounds the fan blades 44 and/or at least a portion of the core engine 16. The nacelle 46 is supported relative to the core engine 16 by a plurality of circumferentially spaced outlet guide vanes 48. Moreover, an aft section 50 of the nacelle 46 extends circumferentially around a portion of the outer casing of the core engine 16 to define a bypass airflow passage 52 therebetween.

During operation of the engine 10, a volume of air, represented by airflow 54, enters the engine 10 through an inlet 56 of the nacelle 46 and/or the fan section 14. As airflow 54 passes across the fan blades 44, a first portion of the airflow 54, represented by bypass airflow 58, is directed or is routed into the bypass airflow passage 52, and a second portion of the airflow 54, represented by core airflow 60, is directed or is routed into an upstream section of the core air flowpath 38 via the annular inlet 20. The ratio between the bypass airflow 58 and the core airflow 60 defines a bypass ratio. The pressure of the core airflow 60 is increased as the core airflow 60 is routed through the high-pressure compressor 26 and into the combustion section 28, where the now highly pressurized core airflow 60 is mixed with fuel and burned to provide combustion products or combustion gases, represented by flow 62.

The combustion gases, via flow 62, are routed into the high-pressure turbine 32 and expanded through the high-pressure turbine 32 where a portion of thermal and/or of kinetic energy from the combustion gases is extracted via sequential stages of high-pressure turbine stator vanes that are coupled to the core engine casing 18 and high-pressure turbine rotor blades 64 that are coupled to the high-pressure shaft 36, thus, causing the high-pressure shaft 36 to rotate, thereby supporting operation of the high-pressure compressor 26. The combustion gases, via flow 62, are then routed into the low-pressure turbine 34 and expanded through the low-pressure turbine 34. Here, a second portion of thermal and kinetic energy is extracted from the combustion gases via sequential stages of the low-pressure turbine stator vanes that are coupled to the core engine casing 18 and low-pressure turbine rotor blades 66 that are coupled to the low-pressure shaft 40, thus, causing the low-pressure shaft 40 to rotate. This thereby supports operation of the booster 24 and rotation of the fan blades 44 via the gearbox assembly 100.

The combustion gases, via flow 62, are subsequently routed through the jet exhaust nozzle section 72 downstream of the low-pressure turbine 34 to provide propulsive thrust. The high-pressure turbine 32, the low-pressure turbine 34, and the jet exhaust nozzle section 72 at least partially define a hot gas path 70 for routing the combustion gases, via flow 62, through the core engine 16. Simultaneously, the pressure of the bypass airflow 58 is increased as the bypass airflow 58 is routed through the bypass airflow passage 52 before being exhausted from a fan nozzle exhaust section 68 of the engine 10, also providing propulsive thrust.

The engine 10 depicted in FIG. 1 is by way of example only. In other exemplary embodiments, the engine 10 may have any other suitable configuration. For example, in other exemplary embodiments, the fan section 14 may be configured in any other suitable manner (e.g., as a fixed pitch fan) and further may be supported using any other suitable fan frame configuration. Moreover, it should be appreciated that, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, and/or turboshaft engines.

Figure 2:
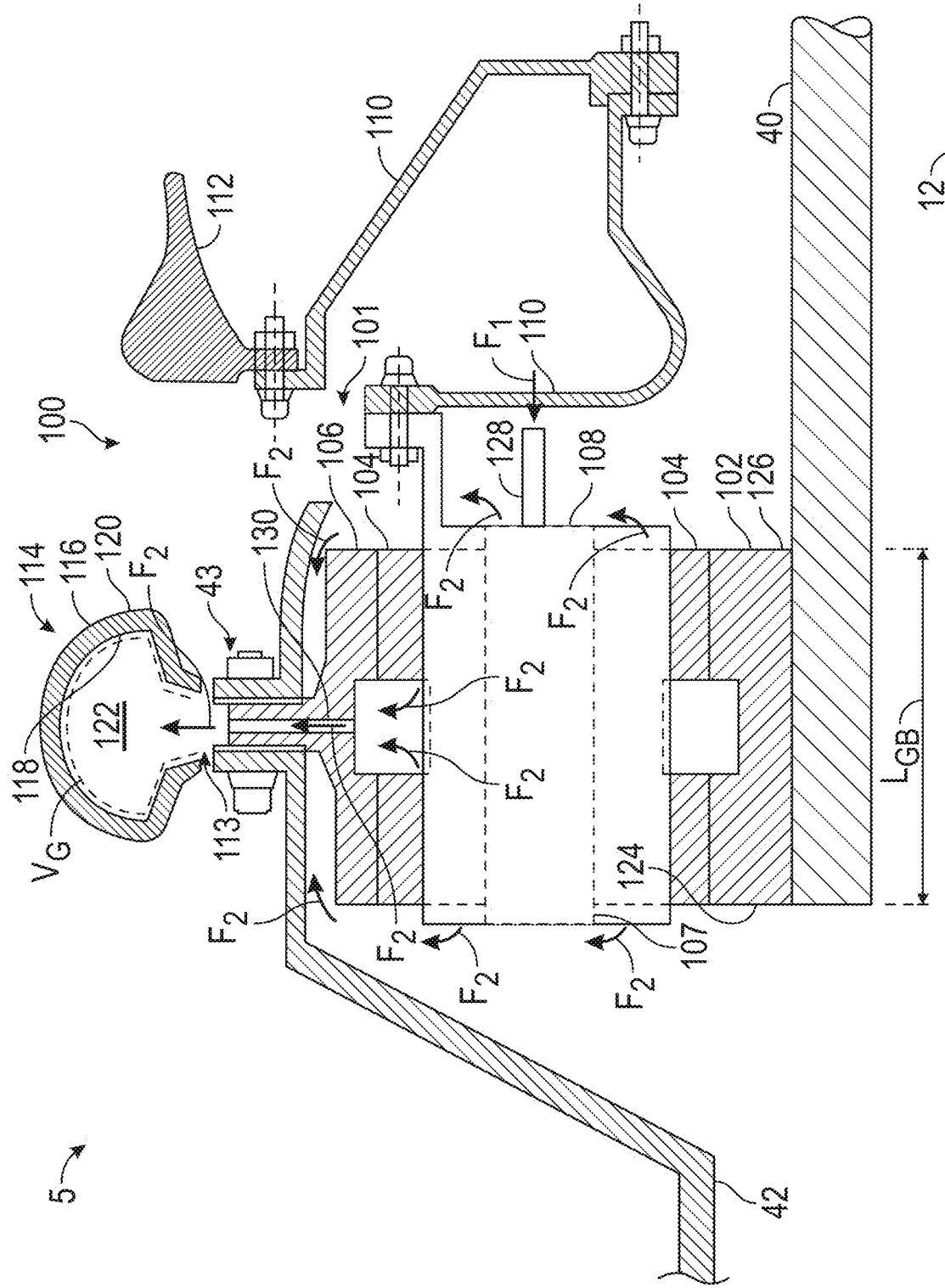
FIG. 2 illustrates a schematic, detail view of the gearbox assembly of the engine of FIG. 1, according to an embodiment of the present disclosure.
Figure 3:
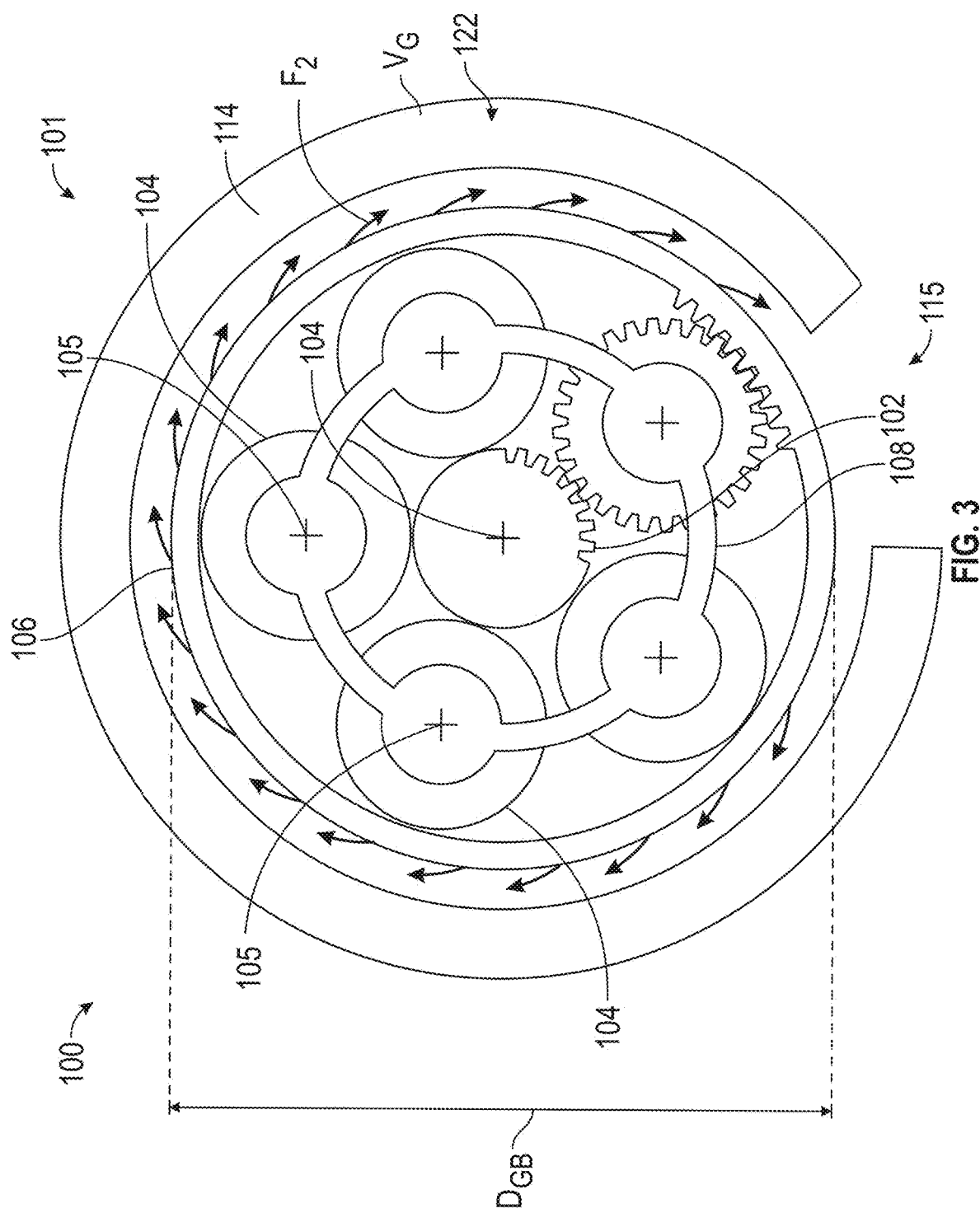
FIG. 3 illustrates a schematic, end view of the gearbox assembly of FIG. 2, taken along line 3-3 of FIG. 1, with the fan shaft omitted for clarity, according to an embodiment of the present disclosure.

FIG. 2 illustrates a detail view 5 of FIG. 1 of the gearbox assembly 100. FIG. 3 illustrates a schematic axial end view, taken along the line 3-3 of FIG. 1, of the gears of the gearbox assembly 100. The fan shaft 42 and a coupling 43 are omitted from FIG. 3 for clarity. Referring to FIGS. 2 and 3, the gearbox assembly 100 includes a gearbox 101 and a gutter 114. The gearbox 101 includes a sun gear 102, a plurality of planet gears 104, and a ring gear 106. The low-pressure turbine 34 (FIG. 1) drives the low-pressure shaft 40, which is coupled to the sun gear 102 of the gearbox assembly 100. The gearbox assembly 100 in turn drives the fan shaft 42.

Referring to FIG. 2, the low-pressure shaft 40 causes the sun gear 102 to rotate about the engine centerline 12. Radially outwardly of the sun gear 102, and intermeshing therewith, is the plurality of planet gears 104 that are coupled together by a planet carrier 108. The planet carrier 108 is coupled, via a flex mount 110, to an engine frame 112. The planet carrier 108 constrains the plurality of planet gears 104 while allowing each planet gear of the plurality of planet gears 104 to rotate about a respective planet gear axis 105 (FIG. 3) on a pin 107. Radially outwardly of the plurality of planet gears 104, and intermeshing therewith, is the ring gear 106, which is an annular ring gear 106. The ring gear 106 is coupled to the fan shaft 42 at a coupling 43. The ring gear 106 is coupled via the fan shaft 42 to the fan blades 44 (FIG. 1) in order to drive rotation of the fan blades 44 about the engine centerline 12. The gutter 114 includes a gutter wall 116 having an inner surface 118 and an outer surface 120. A gutter volume $V_G$ is defined within an interior 122 of the gutter wall 116. The gutter volume $V_G$ is illustrated by the dashed line in FIG. 2 for illustration purposes, the volume $V_G$ extends all the way to the inner surface 118 of the gutter 114. Although the gutter 114 is depicted with a relatively bell-like shape or tear-drop shape, any shape suitable to collecting lubricant is contemplated.

Although not depicted in FIG. 2, and shown only partially in FIG. 3 for clarity, each of the sun gear 102, the plurality of planet gears 104, and the ring gear 106 comprises teeth about their periphery to intermesh with teeth of the adjacent gears. The gearbox 101 has a gearbox diameter $D_{GB}$ defined by an outer diameter of the gearbox 101. The outer diameter of the gearbox 101 may be the outer diameter of the ring gear 106 such that the gearbox diameter $D_{GB}$ is defined by the outer diameter of the ring gear 106. Referring to FIG. 2, the sun gear 102, the plurality of planet gears 104, and the ring gear 106 are axially aligned such that a forwardmost end 124 of the gears is coplanar and an aftmost end 126 of the gears is coplanar. The gearbox 101 has an axial gearbox length $L_{GB}$ defined from the forwardmost end 124 of the gears to the aftmost end 126 of the gears.

Referring to FIG. 3, the gutter 114 may be circular and may wholly or partially circumscribe the gears of the gearbox assembly 100. For example, the gutter 114 may wholly or partially circumscribe the ring gear 106. Therefore, the gutter 114 is located radially outward of the sun gear 102, the plurality of planet gears 104, and the ring gear 106. The gutter 114 does not rotate with the gears of the gearbox assembly 100.

The gutter 114 includes a scavenge port 115 located at or near the bottom of the gutter 114. The scavenge port 115 allows lubricant collected by the gutter 114 to be removed from the gearbox assembly 100. Although shown as a large opening in the gutter 114, the scavenge port 115 may be any size or shape aperture or port that allows a flow of fluid from the interior 122 of the gutter 114 to a passage or reservoir (not depicted) outside of the gearbox assembly 100. By locating the scavenge port 115 at or near the bottom portion of the gutter 114, gravity may assist in causing the lubricant to flow toward the scavenge port 115 and, thus, may promote removal of the lubricant from the gearbox assembly 100. Once removed from the gutter 114, the lubricant may be recirculated through a lubricant channel 128 (FIG. 2) and/or collected elsewhere for disposal and/or removal.

The gearbox assembly 100 of FIGS. 2 and 3 is a star configuration gearbox assembly, in that the planet carrier 108 is held fixed (e.g., via the flex mount 110 to the engine frame 112) and the ring gear 106 is permitted to rotate. That is, the fan section 14 is driven by the ring gear 106. However, other suitable types of gearbox assembly 100 may be employed. In one non-limiting example, the gearbox assembly 100 may be a planetary configuration, in that the planet carrier 108 is coupled to the fan shaft 42 (FIG. 1) via an output shaft to rotate the fan shaft 42, with the ring gear 106 being held stationary or fixed. In this example, the fan section 14 (FIG. 1) is driven by the planet carrier 108. In another non-limiting example, the gearbox assembly 100 may be a differential gearbox in which the ring gear 106 and the planet carrier 108 are both allowed to rotate.

During engine operation, and referring to FIGS. 2 and 3, gears of the gearbox assembly 100 rotate as previously described. A lubricant is provided to lubricate the rotating parts of the gearbox assembly 100, including the sun gear 102, the plurality of planet gears 104, the ring gear 106, and the pins 107. A lubricant system (not shown for clarity) supplies a flow $F_1$, also referred to as a first lubricant flow $F_1$, of the lubricant through the lubricant channel 128 to supply lubricant to the gearbox assembly 100. As the gears of the gearbox assembly 100 rotate, centrifugal forces expel the lubricant radially outward, away from the engine centerline 12, as shown by flow $F_2$, also referred to as a second lubricant flow $F_2$, or a gearbox scavenge flow $F_2$. The flow $F_2$ flows around the ring gear 106 and/or through a ring gear passage 130 to be collected by the gutter 114. The lubricant flows into a gutter inlet 113. In this manner, lubricant supplied through the lubricant channel 128 is collected in the gutter 114 after flowing through and around the gears and other rotating parts of the gearbox assembly 100.

Figure 4:
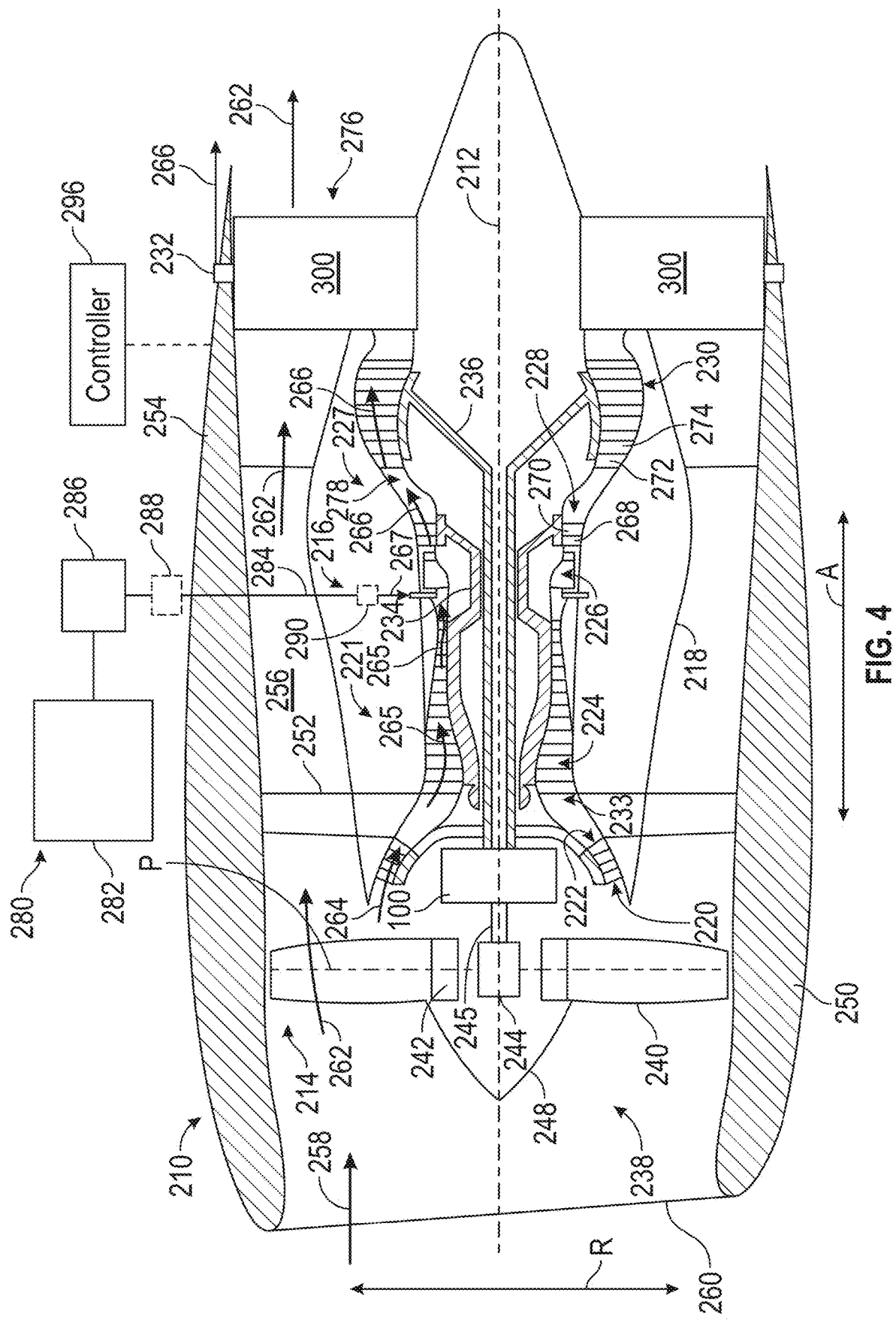
FIG. 4 is a schematic, cross-sectional diagram of a gas turbine engine including a steam system, taken along a longitudinal centerline axis of the gas turbine engine, according to the present disclosure.

FIG. 4 is a schematic, cross-sectional diagram of a gas turbine engine 210 including a steam system 300, taken along a longitudinal centerline axis 212 (also referred to as an engine centerline) of the gas turbine engine 210, according to an embodiment of the present disclosure. As shown in FIG. 4, the gas turbine engine 210 has an axial direction A (extending parallel to the longitudinal centerline axis 212) and a radial direction R that is normal to the axial direction A. In general, the gas turbine engine 210 includes a fan section 214 and a core engine, also referred to as a turbo-engine 216, disposed downstream from the fan section 214.

The turbo-engine 216 includes a core engine casing, also referred to as an outer casing 218, that is substantially tubular and defines an annular inlet, also referred to as a core inlet 220. As schematically shown in FIG. 4, the turbo-engine 216 includes, in serial flow relationship, a compressor section 221 including a booster or a low-pressure compressor (LPC) 222 followed downstream by a high-pressure compressor (HPC) 224, a combustion section having a combustion section, also referred to as a combustor 226, a turbine section 227, including a high-pressure turbine (HPT) 228, followed downstream by a low-pressure turbine (LPT) 230, and a jet exhaust nozzle section having a jet exhaust nozzle section with one or more core exhaust nozzles 232. A high-pressure (HP) shaft 234 or a spool drivingly connects the HPT 228 to the HPC 224 to rotate the HPT 228 and the HPC 224 in unison. A low-pressure (LP) shaft 236 drivingly connects the LPT 230 to the LPC 222 to rotate the LPT 230 and the LPC 222 in unison. The compressor section 221, the combustor 226, the turbine section 227, and the one or more core exhaust nozzles 232 together define a core air flowpath 233.

For the embodiment depicted in FIG. 4, the fan section 214 includes a fan 238 (e.g., a variable pitch fan) having a plurality of fan blades 240 coupled to a disk 242 in a spaced apart manner. As depicted in FIG. 4, the fan blades 240 extend outwardly from the disk 242 generally along the radial direction R. Each fan blade 240 is rotatable relative to the disk 242 about a pitch axis P by virtue of the fan blades 240 being operatively coupled to an actuator 244 configured to collectively vary the pitch of the fan blades 240 in unison. The fan blades 240, the disk 242, and the actuator 244 are together rotatable about the longitudinal centerline axis 212 via a fan shaft 245 that is powered by the LP shaft 236 across a power gearbox. The power gearbox is the gearbox assembly 100 and is shown schematically in FIG. 4.

Referring still to the exemplary embodiment shown in FIG. 4, the disk 242 is covered by a rotatable fan hub 248 aerodynamically contoured to promote an airflow through the plurality of fan blades 240. In addition, the fan section 214 includes a nacelle 250 that circumferentially surrounds the fan 238 and at least a portion of the turbo-engine 216. The nacelle 250 is supported relative to the turbo-engine 216 by a plurality of outlet guide vanes 252 that is spaced circumferentially about the turbo-engine 216. Moreover, a downstream section 254 of the nacelle 250 extends over an outer portion of the turbo-engine 216 to define a bypass airflow passage 256 therebetween. The one or more core exhaust nozzles 232 may extend through the nacelle 250 and be formed therein. In this embodiment, the one or more core exhaust nozzles 232 include one or more discrete nozzles that are spaced circumferentially about the nacelle 250. Other arrangements of the core exhaust nozzles 232 may be used including, for example, a single core exhaust nozzle that is annular, or partially annular, about the nacelle 250.

During operation of the gas turbine engine 210, a volume of air 258 enters the gas turbine engine 210 through an inlet 260 of the nacelle 250 or the fan section 214. As the volume of air 258 passes across the fan blades 240, a first portion of air (bypass air 262) is directed or routed into the bypass airflow passage 256, and a second portion of air (core air 264) is directed or is routed into the upstream section of the core air flowpath 233, or, more specifically, into the core inlet 220 of the LPC 222. The ratio between the bypass air 262 and the core air 264 is known as a bypass ratio. In some embodiments, the bypass ratio is greater than 18:1, enabled by a steam system 300, detailed further below. The pressure of the core air 264 is then increased by the LPC 222, generating compressed air 265, and the compressed air 265 is routed through the HPC 224 and further compressed before being directed into the combustor 226, where the compressed air 265 is mixed with fuel 267 and burned to generate combustion gases 266 (combustion products). One or more stages may be used in each of the LPC 222 and the HPC 224, with each subsequent stage further compressing the compressed air 265. The HPC 224 has a compression ratio greater than 20:1, preferably, in a range of 20:1 to 40:1. The compression ratio is a ratio of a pressure of a last stage of the HPC 224 to a pressure of a first stage of the HPC 224. The compression ratio greater than 20:1 is enabled by the steam system 300, as detailed further below.

The combustion gases 266 are routed into the HPT 228 and expanded through the HPT 228 where a portion of thermal energy and kinetic energy from the combustion gases 266 is extracted via only one stage of HPT stator vanes 268 that are coupled to the outer casing 218 and HPT rotor blades 270 that are coupled to the HP shaft 234, thus, causing the HP shaft 234 to rotate, thereby supporting operation of the HPC 224. The combustion gases 266 are then routed into the LPT 230 and expanded through the LPT 230. Here, a second portion of thermal energy and the kinetic energy is extracted from the combustion gases 266 via sequential stages of LPT stator vanes 272 that are coupled to the outer casing 218 and LPT rotor blades 274 that are coupled to the LP shaft 236, thus, causing the LP shaft 236 to rotate, thereby supporting operation of the LPC 222 and rotation of the fan 238 via the gearbox assembly 100. The HPC 224 having a compression ratio in a range of 20:1 to 40:1 results in the HPT 228 having a pressure expansion ratio in a range of 1.5:1 to 4:1 and the LPT 230 having a pressure expansion ratio in a range of 4.5:1 to 28:1.

The combustion gases 266 are subsequently routed through the one or more core exhaust nozzles 232 of the turbo-engine 216 to provide propulsive thrust. Simultaneously with the flow of the core air 264 through the core air flowpath 233, the bypass air 262 is routed through the bypass airflow passage 256 before being exhausted from a fan bypass nozzle 276 of the gas turbine engine 210, also providing propulsive thrust. The HPT 228, the LPT 230, and the one or more core exhaust nozzles 232 at least partially define a hot gas path 278 for routing the combustion gases 266 through the turbo-engine 216.

As noted above, the compressed air 265 (the core air 264) is mixed with the fuel 267 in the combustor 226 to form a fuel and air mixture, and combusted, generating combustion gases 266 (combustion products). The fuel 267 can include any type of fuel used for turbine engines, such as, for example, sustainable aviation fuels (SAF) including biofuels, JetA, or other hydrocarbon fuels. The fuel 267 also may be a hydrogen-based fuel ($H_2$), and, while hydrogen-based fuels may include blends with hydrocarbon fuels, the fuel 267 used herein is preferably unblended, and referred to herein as hydrogen fuel. In some embodiments, the hydrogen fuel may comprise substantially pure hydrogen molecules (i.e., diatomic hydrogen). The fuel 267 may also be a cryogenic fuel. For example, when the hydrogen fuel is used, the hydrogen fuel may be stored in a liquid phase at cryogenic temperatures.

The gas turbine engine 210 includes a fuel system 280 for providing the fuel 267 to the combustor 226. The fuel system 280 includes a fuel tank 282 for storing the fuel 267 therein, and a fuel delivery assembly 284. The fuel tank 282 can be located on an aircraft (not shown) to which the gas turbine engine 210 is attached. While a single fuel tank 282 is shown in FIG. 4, the fuel system 280 can include any number of fuel tanks 282, as desired. The fuel delivery assembly 284 delivers the fuel 267 from the fuel tank 282 to the combustor 226. The fuel delivery assembly 284 includes one or more lines, conduits, pipes, tubes, etc., configured to carry the fuel 267 from the fuel tank 282 to the combustor 226. The fuel delivery assembly 284 also includes a fuel pump 286 to induce the flow of the fuel 267 through the fuel delivery assembly 284 to the combustor 226. In this way, the fuel pump 286 pumps the fuel 267 from the fuel tank 282, through the fuel delivery assembly 284, and into the combustor 226.

In some embodiments, for example, when the fuel 267 is a hydrogen fuel, the fuel system 280 includes one or more vaporizers 288 (illustrated by dashed lines) and a metering valve 290 (illustrated by dashed lines) in fluid communication with the fuel delivery assembly 284. In this example, the hydrogen fuel is stored in the fuel tank 282 as liquid hydrogen fuel. The one or more vaporizers 288 heat the liquid hydrogen fuel flowing through the fuel delivery assembly 284. The one or more vaporizers 288 are positioned in the flow path of the fuel 267 between the fuel tank 282 and the combustor 226 and are located downstream of the fuel pump 286. The one or more vaporizers 288 are in thermal communication with at least one heat source, such as, for example, waste heat from the gas turbine engine 210 or from one or more systems of the aircraft (not shown). The one or more vaporizers 288 heat the liquid hydrogen fuel and the liquid hydrogen fuel is converted into a gaseous hydrogen fuel within the one or more vaporizers 288. The fuel delivery assembly 284 directs the gaseous hydrogen fuel into the combustor 226.

The metering valve 290 is positioned downstream of the one or move vaporizers 288 and the fuel pump 286. The metering valve 290 receives hydrogen fuel in a substantially completely gaseous phase, or in a substantially completely supercritical phase. The metering valve 290 provides the flow of fuel to the combustor 226 in a desired manner. More specifically, the metering valve 290 provides a desired volume of hydrogen fuel at, for example, a desired flow rate, to a fuel manifold that includes one or more fuel injectors that inject the hydrogen fuel into the combustor 226. The fuel system 280 can include any components for supplying the fuel 267 from the fuel tank 282 to the combustor 226, as desired.

The gas turbine engine 210 includes the steam system 300 in fluid communication with the one or more core exhaust nozzles 232 and the fan bypass nozzle 276. The steam system 300 extracts steam from the combustion gases 266 as the combustion gases 266 flow through the steam system 300, as detailed further below. While the steam system 300 is described in relation to the gas turbine engine 210 in FIG. 4, the steam system 300 can also be utilized in the engine 10 in FIG. 1.

A controller 296 is in communication with the gas turbine engine 210 for controlling aspects of the gas turbine engine 210. For example, the controller 296 is in two-way communication with the gas turbine engine 210 for receiving signals from various sensors and control systems of the gas turbine engine 210 and for controlling components of the gas turbine engine 210, as detailed further below. The controller 296, or components thereof, may be located onboard the gas turbine engine 210, onboard the aircraft, or can be located remote from each of the gas turbine engine 210 and the aircraft. The controller 296 can be a Full Authority Digital Engine Control (FADEC) that controls aspects of the gas turbine engine 210.

The controller 296 may be a standalone controller or may be part of an engine controller to operate various systems of the gas turbine engine 210. In this embodiment, the controller 296 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 296 to perform operations. The controller 296 and, more specifically, the one or more processors are programmed or configured to perform these operations, such as the operations discussed further below. In some embodiments, the instructions can be executed by the one or more processors to cause the one or more processors to complete any of the operations and functions for which the controller 296 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The gas turbine engine 210 depicted in FIG. 4 is by way of example only. In other exemplary embodiments, the gas turbine engine 210 may have any other suitable configuration. For example, in other exemplary embodiments, the fan 238 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, or turboprop engines.

Figure 5:
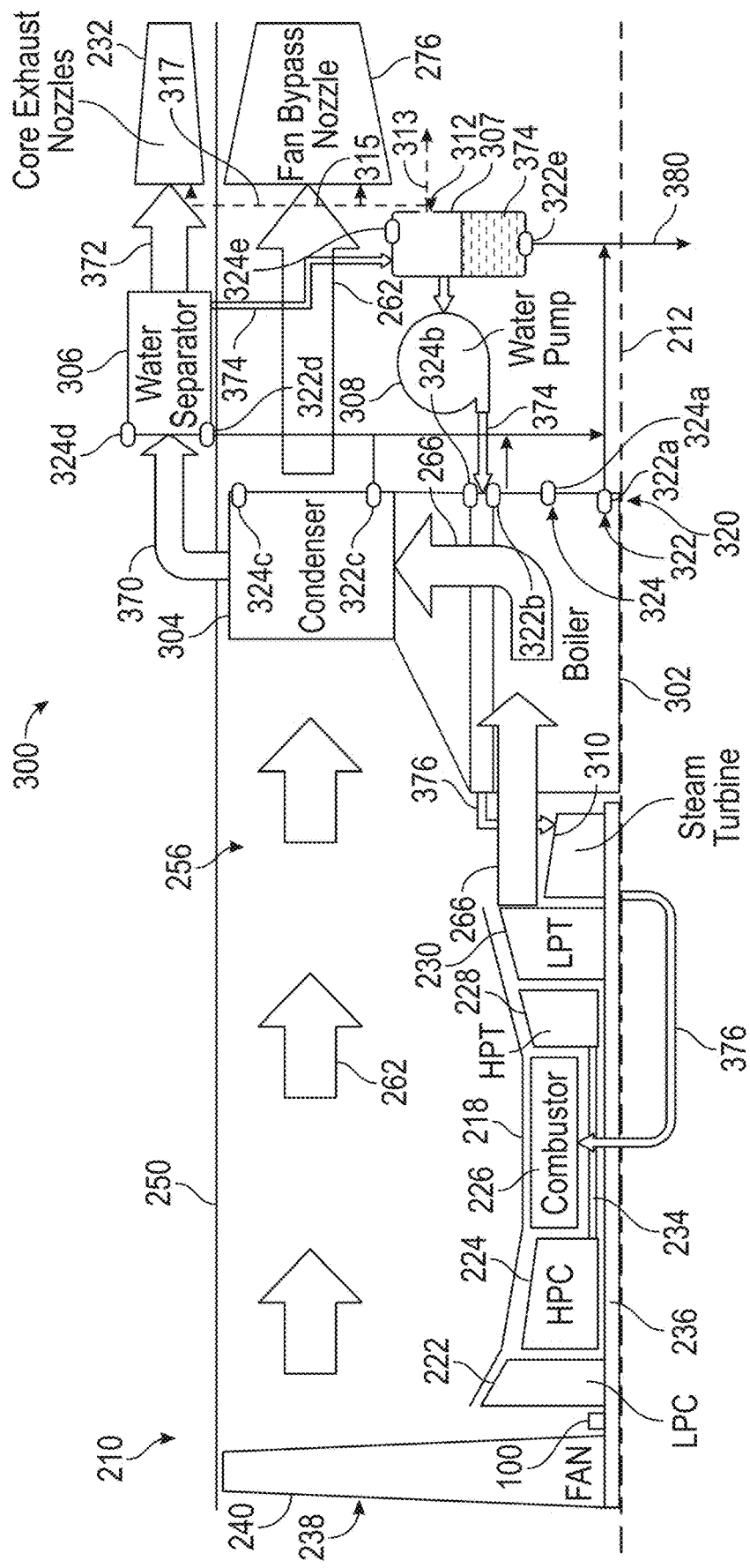
FIG. 5 is a schematic diagram of the gas turbine engine and the steam system of FIG. 1, according to the present disclosure.

FIG. 5 is a schematic diagram of the gas turbine engine 210 and the steam system 300 shown in FIG. 4, according to the present disclosure. For clarity, the gas turbine engine 210 is shown schematically in FIG. 5 and some components are not shown in FIG. 5. The steam system 300 includes a boiler 302, a condenser 304, a water separator 306, one or more water storage devices 307, a water pump 308, and a steam turbine 310.

The boiler 302 is a heat exchanger that vaporizes liquid water from a water source to generate steam or water vapor, as detailed further below. The boiler 302 is thus a steam source. In particular, the boiler 302 is an exhaust gas-water heat exchanger. The boiler 302 is in fluid communication with the hot gas path 278 (FIG. 4) and is positioned downstream of the LPT 230. The boiler 302 is also in fluid communication with the water pump 308, as detailed further below. The boiler 302 can include any type of boiler or heat exchanger for extracting heat from the combustion gases 266 and vaporizing liquid water into steam or water vapor as the liquid water and the combustion gases 266 flow through the boiler 302.

The condenser 304 is a heat exchanger that further cools the combustion gases 266 as the combustion gases 266 flow through the condenser 304, as detailed further below. In particular, the condenser 304 is an air-exhaust gas heat exchanger. The condenser 304 is in fluid communication with the boiler 302 and is positioned within the bypass airflow passage 256. The condenser 304 can include any type of condenser for condensing water (e.g., in liquid form) from the exhaust (e.g., the combustion gases 266). The condenser 304 can be positioned in the gas turbine engine 210 in locations other than the bypass airflow passage 256.

The water separator 306 is in fluid communication with the condenser 304 for receiving cooled exhaust (combustion gases 266) having condensed water entrained therein. The water separator 306 is also in fluid communication with the one or more core exhaust nozzles 232 and with the one or more water storage devices 307. The water separator 306 includes any type of water separator for separating water from the exhaust. For example, the water separator 306 can include a cyclonic separator that uses vortex separation to separate the water from the air. In such embodiments, the water separator 306 generates a cyclonic flow within the water separator 306 to separate the water from the cooled exhaust. In FIG. 5, the water separator 306 is schematically depicted as being in the nacelle 250, but the water separator 306 could be located at other locations within the gas turbine engine 210, such as, for example, radially inward of the nacelle 250, closer to the turbo-engine 216. The water separator 306 may be driven to rotate by one of the core shafts, such as the HP shaft 234 or the LP shaft 236. As noted above, the boiler 302 receives liquid water from a water source to generate steam or water vapor. In the embodiment depicted in FIG. 5, the condenser 304, the water separator 306, or the one or more water storage devices 307, individually or collectively, are the water source for the boiler 302.

The one or more water storage devices 307 are in fluid communication with the water separator 306 and with the water pump 308. The one or more water storage devices 307 are in fluid communication with the condenser 304 via the water separator 306. Each of the one or more water storage devices 307 includes an accumulator tank that accumulates water 374, as detailed further below. Each of the one or more water storage devices 307 includes an overflow drain 312 positioned substantially at a top end of the one or more water storage devices 307. The overflow drain 312 is positioned through the one or more water storage devices 307 such that excess water 374 in the one or more water storage devices 307 drains through the overflow drain 312 and out of the one or more water storage devices 307, as detailed further below. In some embodiments, the overflow drain 312 includes a valve that opens to drain the water 374 through the overflow drain 312 and closes to prevent the water 374 from draining through the overflow drain 312. The valve can be a spring-loaded poppet valve, a check valve, or any other pressure relief valve.

In some embodiments, the one or more water storage devices 307 are arranged in parallel such that each of the one or more water storage devices 307 are separately fluidly coupled with the water pump 308 and the water separator 306. In some embodiments, the one or more water storage devices 307 are arranged in series such that each of the one or more water storage devices 307 is fluidly coupled with each other and the water 374 flows from a respective water storage device 307 to another respective water storage device 307. The one or more water storage devices 307 may be positioned at a bottom end of the gas turbine engine 210 such that the water 374 flows into, and out of, the one or more water storage devices 307 by gravity. The one or more water storage devices 307 can be positioned in the nacelle 250, inside a tail cone of the gas turbine engine 210, inside a wing of the aircraft, or within a fuselage of the aircraft. In embodiments in which the one or more water storage devices 307 are positioned above the water separator 306 (e.g., such that the water 374 cannot flow to the one or more water storage devices 307 via gravity), a pump (e.g., a scavenge pump) pumps the water 374 from the water separator 306 to the one or more water storage devices 307.

The water pump 308 is in fluid communication with the one or more water storage devices 307 and with the boiler 302. The water pump 308 is in fluid communication with the water separator 306 via the one or more water storage devices 307 and with the condenser 304 via the water separator 306. The water pump 308 may be any suitable pump, such as a centrifugal pump or a positive displacement pump. The water pump 308 directs the separated liquid water through the boiler 302 where the separated liquid water is converted back to steam. This steam is sent through the steam turbine 310 then injected core air flowpath 233 (FIG. 4), such as into the combustor 226, upstream of the combustor 226, or downstream of the combustor 226.

The steam system 300 also includes a drain system 320 that includes one or more drain valves 322 and one or more vents 324. The boiler 302, the condenser 304, the water separator 306, and the one or more water storage devices 307 each includes one or more of the one or more drain valves 322 and the one or more vents 324. The one or more drain valves 322 allow the water 374 to drain from each of the various components of the steam system 300 and the one or more vents 324 allow air to vent from each of the various components of the steam system 300, as detailed further below. The one or more drain valves 322 include valves that are controlled to be opened to allow the water 374 to drain through the one or more drain valves 322, and to be closed to prevent the water 374 from draining through the one or more drain valves 322. The one or more vents 324 include valves that are controlled to be opened to allow the air to vent through the one or more vents 324, and to be closed to prevent the air from venting through the one or more vents 324.

The boiler 302 includes a first boiler drain valve 322a and a first boiler vent 324a, and a second boiler drain valve 322b and a second boiler vent 324b. The first boiler drain valve 322a and the first boiler vent 324a are in fluid communication with a first boiler flowpath of the boiler 302 (e.g., a flowpath through which the combustion gases 266 flow). The first boiler drain valve 322a is positioned at a bottom end of the first boiler flowpath of the boiler 302, and the first boiler vent 324a is positioned at a top end of the first boiler flowpath of the boiler 302. The second boiler drain valve 322b and the second boiler vent 324b are in fluid communication with a second boiler flowpath of the boiler 302 (e.g., a flowpath through which the water 374 flows). The second boiler drain valve 322b is positioned at a bottom end of the second boiler flowpath of the boiler 302, and the second boiler vent 324b is positioned at a top end of the second boiler flowpath of the boiler 302.

The condenser 304 includes a condenser drain valve 322c and a condenser vent 324c. The condenser drain valve 322c is positioned at a bottom end of the condenser 304, and the condenser vent 324c is positioned at a top end of the condenser 304. The water separator 306 includes a water separator drain valve 322d and a water separator vent 324d. The water separator drain valve 322d is positioned at a bottom end of the water separator 306, and the water separator vent 324d is positioned at a top end of the water separator 306. The one or more water storage devices 307 include a water storage device drain valve 322e and a water storage device vent 324e. The water storage device drain valve 322e is positioned at a bottom end of the one or more water storage devices 307, and the water storage device vent 324e is positioned at a top end of the one or more water storage devices 307.

In operation, the combustion gases 266, also referred to as exhaust, flow from the LPT 230 into the boiler 302. The combustion gases 266 transfer heat into water 374 (e.g., in liquid form) within the boiler 302, as detailed further below. The combustion gases 266 then flow into the condenser 304. The condenser 304 condenses the water 374 (e.g., in liquid form) from the combustion gases 266. The bypass air 262 flows through the bypass airflow passage 256 and over or through the condenser 304 and extracts heat from the combustion gases 266, cooling the combustion gases 266 and condensing the water 374 from the combustion gases 266 to generate an exhaust-water mixture 370. The bypass air 262 is then exhausted out of the gas turbine engine 210 through the fan bypass nozzle 276 to generate thrust, as detailed above. The condenser 304 thus may be positioned in bypass airflow passage 256.

The exhaust-water mixture 370 flows into the water separator 306. The water separator 306 separates the water 374 from exhaust 372 of the exhaust-water mixture 370 to generate separate the exhaust 372 and the water 374. The exhaust 372 is exhausted out of the gas turbine engine 210 through the one or more core exhaust nozzles 232 to generate thrust, as detailed above. The boiler 302, the condenser 304, and the water separator 306 thus also define a portion of the hot gas path 278 (FIG. 4) for routing the combustion gases 266, the exhaust-water mixture 370, and the exhaust 372 through the steam system 300 of the gas turbine engine 210.

The water 374 (e.g., in liquid form) flows from the water separator 306 into the one or more water storage devices 307. The one or more water storage devices 307 store the water 374 therein. When the water 374 fills the one or more water storage devices 307 to the overflow drain 312, excess water 374 drains out of the one or more water storage devices 307 through the overflow drain 312. The overflow drain 312 maintains the water 374 in the one or more water storage devices 307 at a desired maximum water level such that the one or more water storage devices 307 do not overfill with the water 374. The overflow drain 312 can be fluidly coupled to a drain nozzle such that the excess water 374 drains through the drain nozzle and out of the gas turbine engine 210 (as indicated by arrow 313). Alternatively, or additionally, the overflow drain 312 can be fluidly coupled to the fan bypass nozzle 276 such that the excess water 374 drains from the one or more water storage devices 307 through the fan bypass nozzle 276 and out of the gas turbine engine 210 (as indicated by arrow 315). Alternatively, or additionally, the overflow drain 312 can be fluidly coupled to the one or more core exhaust nozzles 232 such that the excess water 374 drains from the one or more water storage devices 307 through the one or more core exhaust nozzles 232 and out of the gas turbine engine 210 (as indicated by arrow 317).

During steady state operating conditions of the gas turbine engine 210, the steam system 300 produces enough water 374 to generate an amount of the steam 376 for maintaining operation of the gas turbine engine 210, also referred to as an operating level of the steam 376. In such steady state conditions, the steam system 300 generates an excess amount of the water 374 that fills the one or more water storage devices 307 to the maximum water level and then the water 374 flows through the one or more water storage devices 307 and to the boiler 302. For example, during steady state operating conditions, the input of the water 374 into the one or more water storage devices 307 is greater than the output of the water 374 from the one or more water storage devices 307.

The water pump 308 pumps the water 374 (e.g., in liquid form) from the one or more water storage devices 307 through one or more water lines (as indicated by the arrow for the water 374 in FIG. 5) and the water 374 flows through the boiler 302. As the water 374 flows through the boiler 302, the combustion gases 266 flowing through the boiler 302 transfer heat into the water 374 to vaporize the water 374 and to generate the steam 376 (e.g., vapor). The steam turbine 310 includes one or more stages of steam turbine blades (not shown) and steam turbine stators (not shown). The steam 376 flows from the boiler 302 into the steam turbine 310, through one or more steam lines (as indicated by the arrow for the steam 376 in FIG. 5), causing the steam turbine blades of the steam turbine 310 to rotate, thereby generating additional work in an output shaft (e.g., one of the core shafts) connected to the turbine blades of the steam turbine 310. The steam system 300 may recover up to 70% of the water 374 from the combustion gases 266 and converts the water 374 into the steam 376.

As noted above, the turbo-engine 216 includes shafts, also referred to as core shafts 234, 236, coupling various rotating components of the turbo-engine 216 and other thrust producing components such as the fan 238. In the turbo-engine 216 shown in FIG. 4, these core shafts 234, 236 include the HP shaft 234 and the LP shaft 236. The steam turbine 310 is coupled to one of the core shafts 234, 236 of the turbo-engine 216, such as the HP shaft 234 or the LP shaft 236. In the illustrated embodiment, the steam turbine 310 is coupled to the LP shaft 236. As the steam 376 flows from the boiler 302 through the steam turbine 310, the kinetic energy of this gas is converted by the steam turbine 310 into mechanical work in the LP shaft 236. The reduced temperature steam 376 exiting the steam turbine 310 is then injected into, or upstream of, the combustor 226. The steam 376 injected into the core air flowpath 233 (FIG. 4) (e.g., into, upstream of, or downstream of, the combustor 226) adds mass flow to the core air 264 such that less core air 264 is needed to produce the same amount of work through the turbine section 227. In this way, the steam system 300 extracts additional work from the heat in exhaust gas that would otherwise be wasted. The steam 376 injected into the core air flowpath 233 (FIG. 4) is in a range of 20% to 50% of the mass flow through the core air flowpath 233 (FIG. 4).

The steam turbine 310 has a pressure expansion ratio in a range of 2:1 to 6:1. The pressure expansion ratio is a ratio of the pressure at an inlet of the steam turbine 310 to the pressure at an exit of the steam turbine 310. The steam turbine 310 contributes approximately 25% of the power to the LP shaft 236 (or to the HP shaft 234) when the steam system 300 recovers approximately 70% of the water 374 and converts the water 374 into the steam 376. The steam turbine 310 has a pressure expansion ratio in a range of 2:1 to 6:1, the LPT 230 has a pressure expansion ratio in a range of 4.5:1 to 28:1, and the steam 376 contributes to 20% to 50% of the mass flow through the core air flowpath 233 (FIG. 4). The steam turbine 310 expands the steam 376, thereby reducing the energy of the steam 376 and reducing the temperature of the steam 376 to approximately a temperature of the compressed air 265 (FIG. 4) that is discharged from the HPC 224. Such a configuration enables the steam 376 to reduce hot spots in the combustor 226 from the combustion of the fuel (e.g., in particular when the fuel is supercritical hydrogen or gaseous hydrogen).

The additional work that is extracted by the steam system 300 and the steam 376 injected into the core air flowpath 233 enables a size of the turbo-engine 216 (FIG. 4) to be reduced, thereby increasing the bypass ratio of the gas turbine engine 210, as compared to turbine engines without the benefit of the present disclosure. In this way, the gas turbine engine 210 has a bypass ratio greater than 18:1, preferably, in a range of 18:1 to 100:1. In this way, the steam system 300 can enable an increased bypass ratio in which the gas turbine engine 210 can move a larger mass of air through the bypass, reducing the pressure ratio of the fan 238 and increasing the efficiency of the gas turbine engine 210 as compared to turbine engines without the benefit of the present disclosure.

The steam 376 injected into the core air flowpath 233 also enables the HPT 228 to have a greater energy output with fewer stages of the HPT 228 as compared to HPTs without the benefit of the present disclosure. For example, the additional mass flow from the steam 376 through the turbine section 227 helps to produce a greater energy output. In this way, the HPT 228 may only have one stage capable of sustainably driving a higher number of stages of the HPC 224 (e.g., 10, 11, or 12 stages of the HPC 224) due to the higher mass flow (resulting from the steam injection) exiting the combustor 226. The steam 376 that is injected into the core air flowpath 233 enables the HPT 228 to have only one stage that drives the plurality of stages of the HPC 224 without reducing an amount of work that the HPT 228 produces as compared to HPTs without the benefit of the present disclosure, while also reducing a weight of the HPT 228 and increasing an efficiency of the HPT 228, as compared to HPTs without the benefit of the present disclosure.

With less core air 264 needed due to the added mass flow from the steam 376, the compression ratio of the HPC 224 may be increased as compared to HIPCs without the benefit of the present disclosure. In this way, the HPC 224 has a compression ratio greater than 20:1. In some embodiments, the compression ratio of the HPC 224 is in a range of 20:1 to 40:1. Thus, the compression ratio of the HPC 224 is increased, thereby increasing the thermal efficiency of the gas turbine engine 210 as compared to HPCs and turbine engines without the benefit of the present disclosure. Further, the HPC 224 may have a reduced throat area due to the added mass flow in the turbo-engine 216 provided by the steam 376 injected into the turbo-engine 216. Accordingly, the HPC 224 has a reduced size (e.g., outer diameter) and a reduced weight, as compared to turbine engines without the benefit of the present disclosure.

In some embodiments, the HPC stator vanes of at least two stages of the HPC 224 are variable stator vanes that are controlled to be pitched about a pitch axis to vary a pitch of the HPC stator vanes. In some embodiments, the HPC 224 includes one or more compressor bleed valves that are controlled to be opened to bleed a portion of the compressed air 265 from the HPC 224. The one or more compressor bleed valves are preferably positioned between a fourth stage of the HPC 224 and a last stage of the HPC 224. The HPC stator vanes that are variable stator vanes, and the one or more compressor bleed valves, help to balance the air flow (e.g., the compressed air 265) through all stages of the HPC 224. Such a balance, in combination with the steam 376 injected into the core air flowpath 233 to flow through the core air flowpath 233, enables the number of stages of the HPC 224 to include ten to twelve stages for compression ratios to be greater than 20:1, and preferably in a range of 20:1 to 40:1.

During transient operating conditions of the gas turbine engine 210, the steam system 300 may not be able to extract enough water 374 from the combustion gases 266 to maintain the operating level of the steam 376 that is injected into the core air flowpath 233. During such transient operating conditions, the input of the water 374 into the one or more water storage devices 307 is less than the output of the water 374 from the one or more water storage devices 307. Accordingly, the steam system 300 supplies the water 374 that has accumulated in the one or more water storage devices 307 to the boiler 302 during transient conditions such that the water 374 drains from water storage device 307. In this way, the level of the water 374 in the one or more water storage devices 307 decreases during the transient operating conditions.

Accordingly, the one or more water storage devices 307 include two states including a first state and a second state. The first state occurs when the one or more water storage devices 307 are being filled with the water 374 or maintains a level of the water 374 in the one or more water storage devices 307. For example, the first state occurs during steady state operation of the gas turbine engine 210 when the steam system 300 is able to extract a first amount of the water 374 that is an equal amount or a greater amount of the water 374 than is necessary for generating the operating level of the steam 376. The second state occurs when the water 374 in the one or more water storage devices 307 drains from the one or more water storage devices 307 such that the level of the water 374 in the one or more water storage devices 307 decreases. For example, the second state occurs during transient operation conditions of the gas turbine engine 210 when the steam system 300 is unable to extract the equal amount or greater amount of the water 374 necessary for generating the operating level of the steam 376. In this way, the second state occurs when the steam system 300 extracts a second amount of the water 374 that is a lesser amount of the water 374 than is necessary for generating the operating level of the steam 376. In some embodiments, the water storage device 307 is filled with the water 374 on the ground prior to the gas turbine engine 210 powering on (e.g., by a human). In some embodiments, the water storage device 307 is primed with the water 374 prior to initiating injection of the steam 376. In some embodiments, the water storage device 307 collects the water 374 while the gas turbine engine 210 is operating at idle conditions.

In certain conditions, when the gas turbine engine 210 is not operating (e.g., the gas turbine engine 210 is shut down), the water 374 in the steam system 300 can freeze. For example, when the gas turbine engine 210 is shut down and the temperature is below freezing (e.g., less than 0° C.), the water 374 in the steam system 300 can freeze. To prevent the water 374 from freezing in the steam system 300, the drain system 320 opens to drain the water 374 from the steam system 300. Each of the one or more drain valves 322 opens when the gas turbine engine 210 is shut down such that the water 374 drains from the steam system 300 and out of the gas turbine engine 210 (as indicated by arrow 380). For example, the first boiler drain valve 322a and the second boiler drain valve 322b open to drain the water 374 from the boiler 302, the condenser drain valve 322c opens to drain the water 374 from the condenser 304, the water separator drain valve 322d opens to drain the water 374 from the water separator 306, and the water storage device drain valve 322e opens to drain the water 374 from the water storage device 307. At the same time, the one or more vents 324 open to vent air within the steam system 300 to prevent a vacuum within the steam system 300 as the water 374 is draining. For example, the first boiler vent 324a and the second boiler vent 324b open to vent the boiler 302, the condenser vent 324c opens to vent the condenser 304, the water separator vent 324d opens to vent the water separator 306, and the water storage device vent 324e opens to vent the water storage device 307.

The one or more drain valves 322 and the one or more vents 324 are opened automatically when the gas turbine engine 210 shuts down. For example, the controller 296 (FIG. 4) controls the one or more drain valves 322 to open the one or more drain valves 322 and controls the one or more vents 324 to open the one or more vents 324 when the gas turbine engine 210 is shut down. In some embodiments, the one or more drain valves 322 and the one or more vents 324 open when the controller 296 is de-energized (e.g., the controller 296 is not receiving power), and the one or more drain valves 322 and the one or more vents 324 close when the controller 296 is energized (e.g., the controller 296 receives power). In some embodiments, the controller 296 determines the gas turbine engine 210 is in a shutdown, and opens the one or more drain valves 322 and the one or more vents 324 upon determining the gas turbine engine 210 is in the shutdown. The one or more drain valves 322 and the one or more vents 324 can be opened and closed individually such that only certain ones of the one or more drain valves 322 and the one or more vents 324 are opened during the shutdown.

Figure 6:
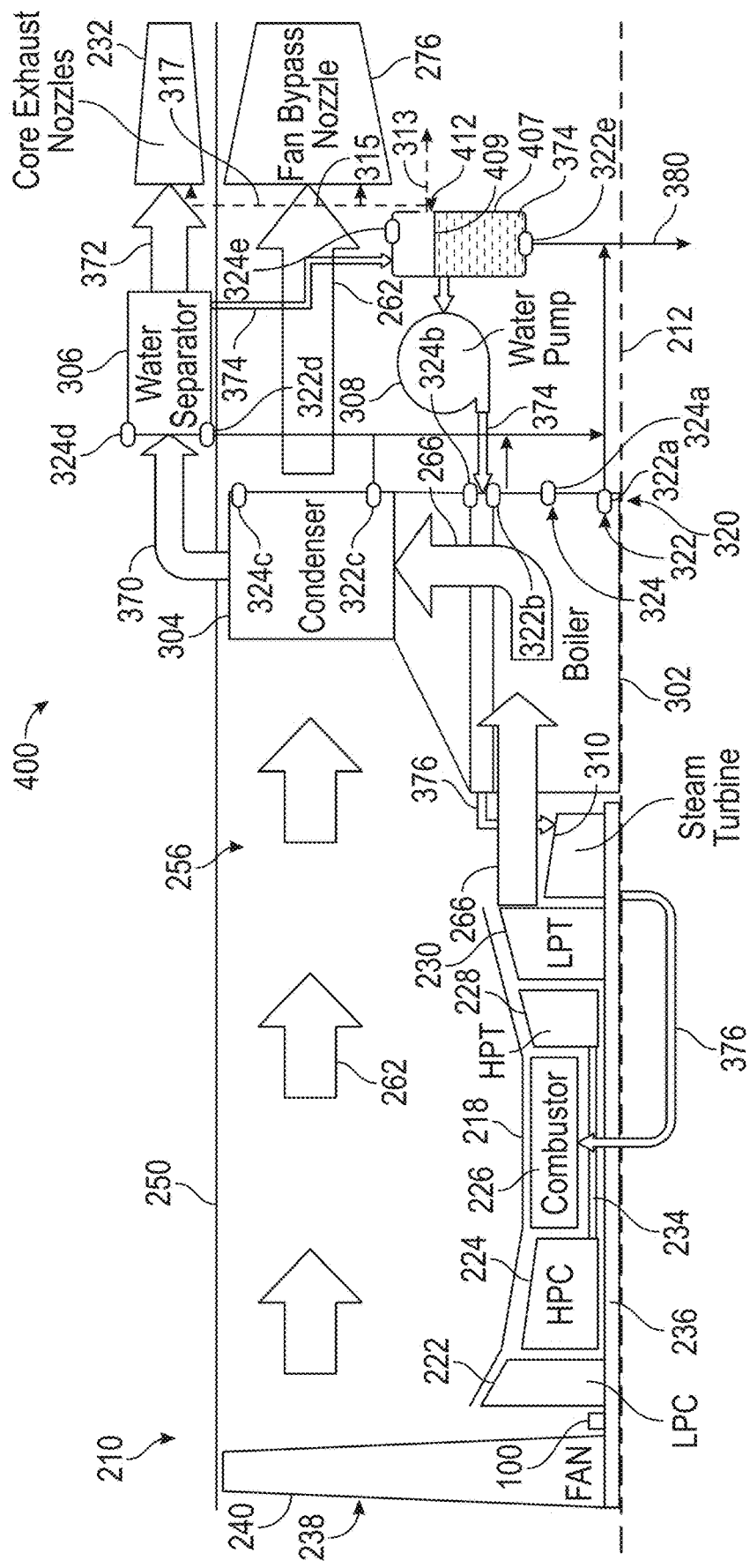
FIG. 6 is a schematic diagram of the gas turbine engine and a steam system, according to another embodiment.

FIG. 6 is a schematic diagram of the gas turbine engine 210 and a steam system 400, according to another embodiment. The steam system 400 is substantially similar to the steam system 300 shown in FIG. 5 and includes many of the same or similar components and operates substantially similar as the steam system 300. The steam system 400 includes one or more water storage devices 407 that are different than the one or more water storage devices 307 shown in FIG. 5. The one or more water storage devices 407 include a variable volume that is adjusted by an adjustable diaphragm 409. The water 374 in the one or more water storage devices 407 fills to the adjustable diaphragm 409. In this way, a level (e.g., a volume) of the water 374 in the one or more water storage devices 407 is based on a position of the adjustable diaphragm 409 in the one or more water storage devices 407. The adjustable diaphragm 409 can move up or move down within the one or more water storage devices 407 to change the level (e.g., the volume) of the water 374 in the one or more water storage devices 407. For example, the controller 296 (FIG. 4) controls the adjustable diaphragm 409 to move up or to move down to adjust the level of the water 374 in the one or more water storage devices 407. In some embodiments, the adjustable diaphragm 409 moves up or moves down by a pressure within the one or more water storage devices 407 such that the one or more water storage devices 407 are passively pressurized. The adjustable diaphragm 409 pressurizes the one or more water storage devices 407 to reduce or to minimize fluctuations in the pressure of the water 374 in the steam system 400. The one or more water storage devices 407 also includes an overflow drain 412 to maintain the level of the water 374 in the one or more water storage devices 407 at the maximum water level during steady state operating conditions (e.g., when the input of the water is greater than the output of the water).

Accordingly, the steam systems 300 (FIG. 4), 400 (FIG. 6) detailed herein provide for supplying the water 374 to the boiler 302 even during transient operating conditions when the steam systems 300, 400 may not be able to extract enough water 374 to generate the operating level of the steam 376. In this way, the steam systems 300, 400 produce the operating level of the steam 376 during all operating conditions of the gas turbine engine 210, i.e., during both steady state operating conditions and transient operating conditions without significantly increasing the overall weight of the gas turbine engine 210 (e.g., by adding a large water storage tank). The drain system 320 ensures the water 374 in the steam systems 300, 400 does not freeze when the gas turbine engine 210 is shut down. Further, the additional work that is extracted by the steam system 300 and the steam 376 that is expanded through the steam turbine 310 and is injected into the core air flowpath 233 enables the gas turbine engine 210 to have a bypass ratio greater than 18:1

(e.g., preferably, in a range of 18:1 to 100:1), enables the HPT 228 to have only one stage that drives a plurality of stages of the HPC 224, and enables the HPC 224 to have a compression ratio greater than 20:1 (e.g., preferably, in a range of 20:1 to 40:1).

Further, the fan 238 of the turbine engine 210 with the steam system 300 has a size (e.g., fan tip diameter) and a rotational speed that are similar to the size and the rotational speed of a turbine engine without the benefit of the present disclosure at the same maximum thrust level, and, thus, the turbine engine 210 has a higher bypass ratio than the turbine engine without the steam system. Therefore, with the smaller core of the turbine engine 210, the rotational speed of the HP shaft 234 and the LP shaft 236 is greater than in a turbine engine without the benefit of the present disclosure and at the same maximum thrust level. The increased rotational speed of the core provides for a higher ratio between the input speed (e.g., the rotational speed of the LP shaft 236) and the output speed (e.g., the rotational speed of the fan 238) through the gearbox assembly 100. Accordingly, the gearbox assembly 100 is a compound epicyclic gearbox (e.g., the gears are compound gears having two stages) to account for the increased ratio between the input speed and the output speed. The compound epicyclic gearbox assembly has an increased number of gear meshes as compared to a gearbox assembly with single stage gears, and, as such, has a larger volume than the gearbox assembly with single stage gears. In this way, the gearbox 101 requires increased lubrication of the gears, and, thus, the gearbox 101 has a greater volume as compared to gearboxes without the benefit of the present disclosure. The gutter 114 increases in size proportionately to the volume of the gearbox 101, as with the increased number of gear meshes, additional friction points will occur requiring increased lubrication.

With reference back to FIG. 3, as the volume of the gearbox 101 increases, the diameter of the gearbox $D_{GB}$, increases. As the power output of the gearbox 101 increases the amount of heat generated increases. The increase in heat generation increases the volume of lubricant required to operate the gearbox, which calls for an increased gutter volume $V_G$ for capture and recirculation of lubricant through the scavenging system. However, it is also desired to reduce the overall footprint of the gearbox, oil and scavenge system given an emphasis on decreasing packaging space available for the gearbox and oil scavenge system, especially for engines with power gearboxes operating with relatively high gear ratios, e.g., between, inclusive of the endpoints, 2.5 to 3.5, 3.0, 3.25, 4.0 and above gear ratios (GRs).

In view of the foregoing, it is desirable to improve, or at least maintain, a target efficiency of a gearbox without oversizing a gutter or scavenge system, or while reducing its size to accommodate only what is needed or can be accommodated in terms of weight increase or volume. When developing a gas turbine engine, the interplay among components can make it particularly difficult to select or to develop one component (e.g., the gutter 114) during engine design and prototype testing, especially, when some components are at different stages of completion. For example, one or more components may be nearly complete, yet one or more other components may be in an initial or preliminary phase. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration. For example, various aspects of the fan section 14 design, compressor section 22 design, combustion section 28, and/or turbine section 30 design, may not be known at the time of design of the gutter, but such components impact the size of the gearbox 101 required and the amount of lubricant required, and thus, the design of the gutter 114.

The inventors desire to arrive at a more favorable balance between maximizing gearbox scavenge flow collection while minimizing other, potential negative effects on an improperly chosen gutter size had previously involved, e.g., the undertaking of multivariate trade studies, which may or may not have yielded an improved, or best match gutter/scavenge for a particular architecture. Unexpectedly, it was discovered that a relationship exists between the volume of the gutter and gearbox volume that uniquely identified a finite and readily ascertainable (in view of this disclosure) number of embodiments suited for a particular architecture, which improves the weight-volume-scavenge effectiveness tradeoffs for a particular architecture. This relationship the inventors refer to as the Lubricant Extraction Volume Ratio (LEVR):

$$LEVR = \frac{V_G}{V_{GB}} \quad (1)$$

$V_G$ represents the gutter volume, as identified with respect to FIGS. 2 and 3. The gutter volume may be determined by calculating the volume within a cross section of the gutter. $V_{GB}$ represents the gearbox volume, which is defined below (2). For engine power between eighteen kHP and thirty-five kHP, inclusive of the endpoints, the gearbox volume $V_{GB}$ is between eight hundred in³ and two thousand in³, inclusive of the endpoints. In some examples, the engine is a turbofan engine. The inventors found that the gutter volume $V_G$ should be selected based on the range 0.01≤LEVR≤to 0.3 (gutter volume is between 1 percent and 30 percent the gearbox volume, inclusive of the endpoints).

$$V_{GB} = L_{GB} * \pi * \left(\frac{D_{GB}}{2}\right)^2 \quad (2)$$

$L_{GB}$ represents the gearbox length, as identified with respect to FIG. 2. Although described with respect to gears of the same length in FIG. 2, the gearbox length may be defined by any of the sun gear 102, a planet gear 104, or the ring gear 106, instances when the aforementioned gears are of different lengths. In (2), $D_{GB}$ represents the gearbox diameter, as identified with respect to FIG. 3.

Figure 7:
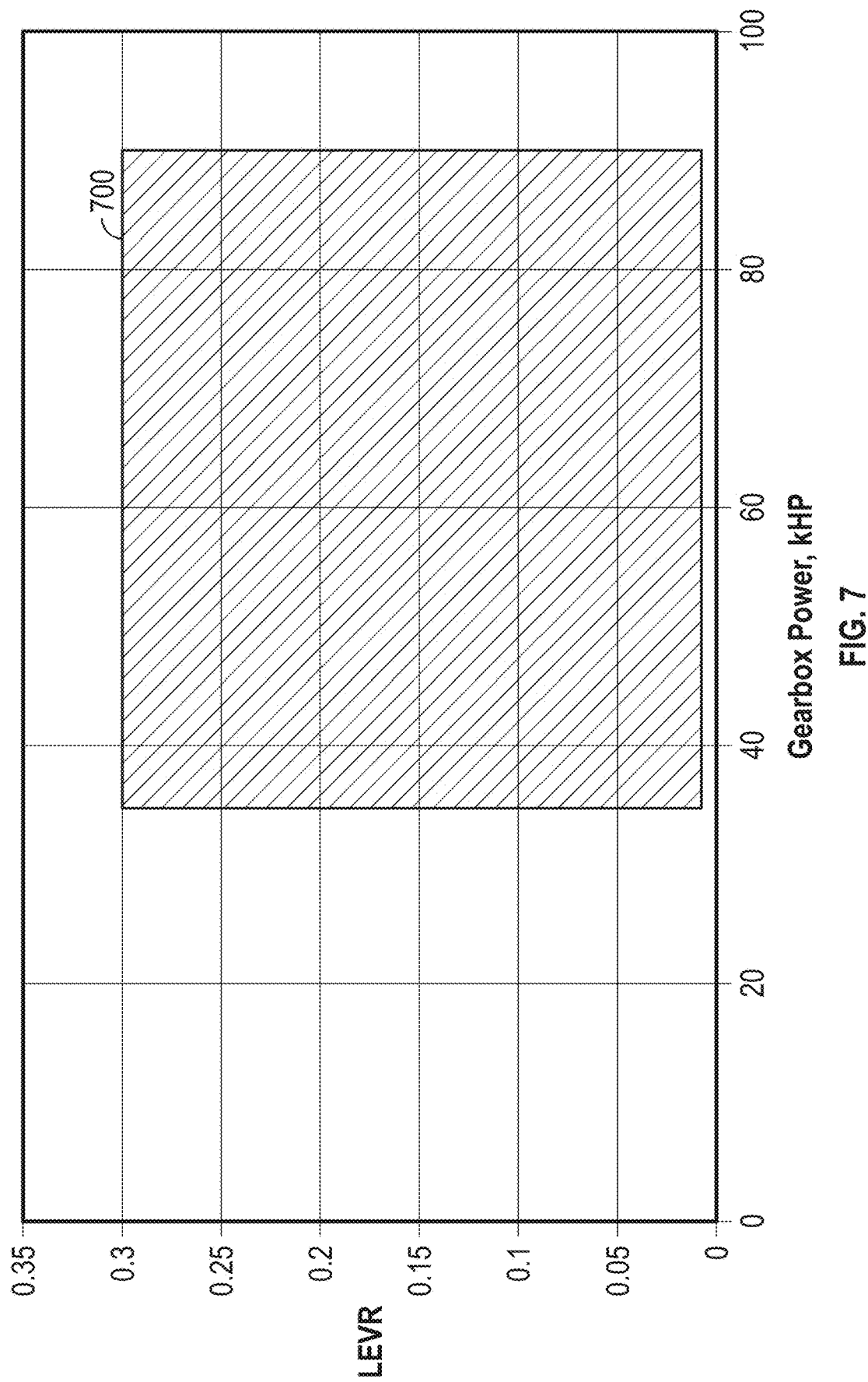
FIG. 7 illustrates a graph showing the lubricant extraction volume ratio as a function of gearbox power, according to an embodiment of the present disclosure.
Figure 8:
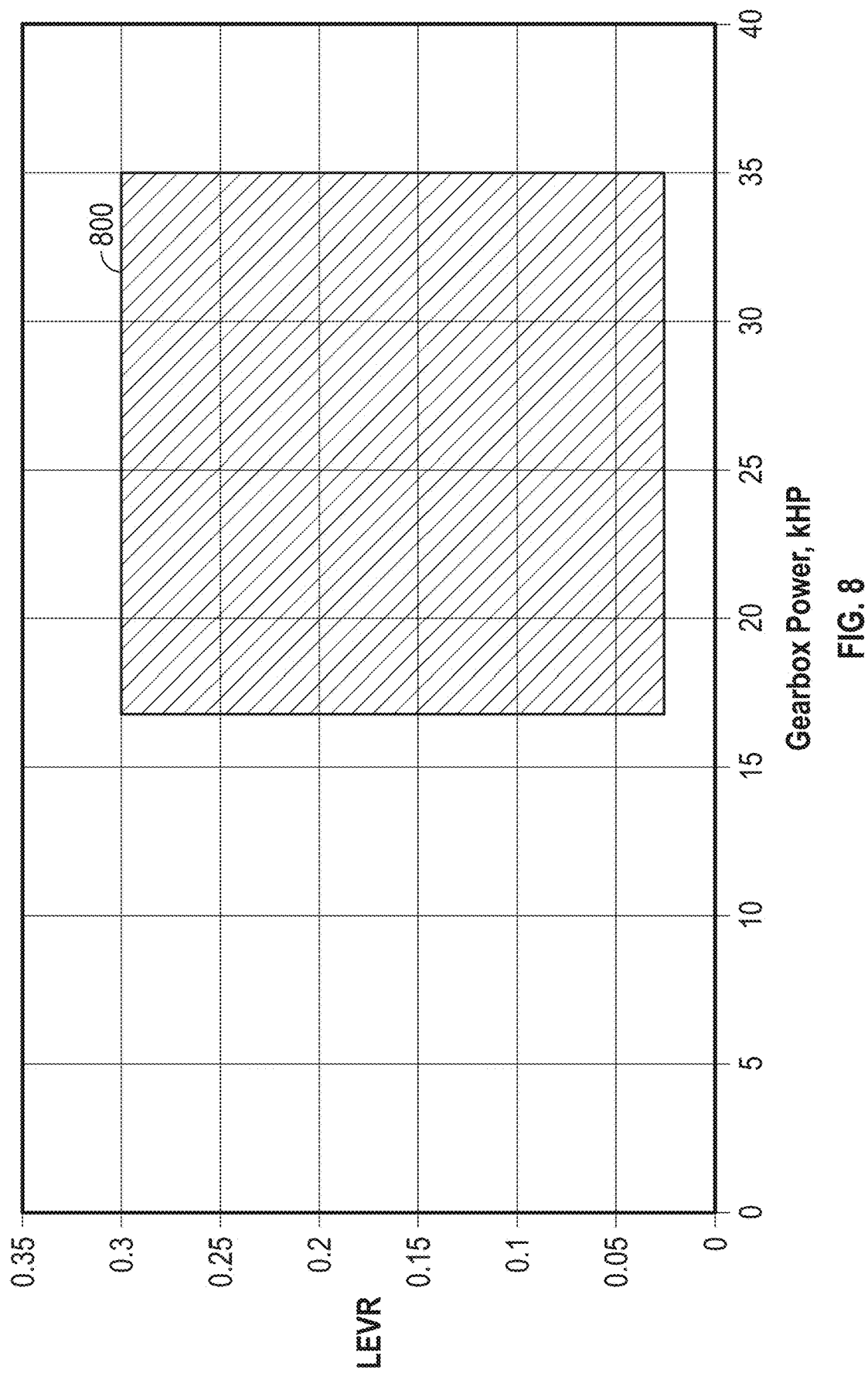
FIG. 8 illustrates a graph showing the lubricant extraction volume ratio as a function of gearbox power, according to an embodiment of the present disclosure.

In some embodiments, and as shown in a region 700 shown in FIG. 7, LEVR is between 0.01 and 0.3, inclusive of the endpoints, for maximum gearbox power of between thirty-five kHP and ninety kHP, inclusive of the endpoints. In some embodiments, and as shown in a region 800 in FIG. 8, LEVR is between 0.03 and 0.3, inclusive of the endpoints, for a maximum gearbox power of less than or equal to thirty-five kHP.

If the gutter volume relative to the gearbox volume is such that the LEVR upper limit is exceeded (e.g., a "large gutter"), there is too large of a volume within the gutter than is needed to recover gearbox lubricant scavenge, which can lead to increased lubricant churning loss and lubricant foaming in the gutter, leading to increased power loss in the overall gearbox assembly. The foaming in the gutter can generate drag in the gutter and negatively impact gearbox performance, and ultimately, engine performance. Furthermore, a large gutter requires more radial space and the increased material, mass, and size, etc., of the large gutter encroaches upon other system components within the engine (e.g., the core flow path), which, again, negatively impacts gearbox performance. The LEVR is selected to balance recovery of gearbox lubricant scavenge and impact to the engine operation and efficiency.

If the gutter volume relative to the gearbox volume is such that the LEVR lower limit is violated (e.g., a "small gutter"), there is too small of a volume within the gutter than is needed to recover the gearbox lubricant scavenge. The gutter will not fully capture the gearbox lubricant scavenge (e.g., flow $F_2$), leading to inadequate removal of the lubricant from the gearbox sump. This can lead to leakage of the scavenge lubricant back into the gearbox and/or to other areas of the engine, negatively impacting the performance of both the gearbox and the engine. The lower limit of the LEVR is selected to balance recovery of gearbox lubricant scavenge and impact to the gearbox and engine operation and efficiency (e.g., volume & weight penalty).

Taking into consideration the above considerations for selecting upper and lower limits, the LEVR may also be defined in terms of a Power Factor, Flow Transition Time and a Heat Density Parameter:

$$LEVR = PF * \frac{FT}{HDP} \quad (3)$$

where PF represents the Power Factor, FT represents the Flow Transition Time, and HDP represents the Heat Density parameter. The Power Factor PF is defined in (4):

$$PF = PD * (1 - \eta) \quad (4)$$

where PD represents the gearbox power density and $\eta$ represents the gearbox efficiency. The power density PD is a ratio of the power of the gearbox to the volume of the gearbox and is between fifteen thousand hp/ft³ and forty-five thousand hp/ft³, inclusive of the endpoints. The gearbox efficiency is between 99.2 percent and 99.8 percent, inclusive of the endpoints.

The Flow Transition Time FT is given by:

$$FT = \frac{V_G}{V_{dot}} \quad (5)$$

where $V_G$ represents the gutter volume, as identified with respect to FIGS. 2 and 3. $V_{dot}$ represents the lubricant volumetric flow rate. The lubricant volumetric flow rate is defined by the gearbox power and the efficiency. Since the inefficiency of the gearbox generates heat, a certain quantity of lubricant is required to remove the heat. The Flow Transition Time is the time it takes the lubricant to traverse the entire gutter volume. The Flow Transition Time indirectly links the gutter volume to the gearbox volume. The Flow Transition Time is between 1.5 and eleven seconds, inclusive of the endpoints.

The Heat Density parameter HDP is defined as:

$$HDP = \rho * C * \Delta T \quad (6)$$

where $\rho$ represents the fluid density, C represents the lubricant specific heat, and $\Delta T$ represents the temperature rise in the lubricant, which, is between twenty degrees Celsius and forty-five degrees Celsius, inclusive of the endpoints.

Table 1 describes exemplary embodiments 1 and 2 identifying the LEVR for various engines. The embodiments 1 and 2 are for narrow body, turbofan engines. The LEVR of the present disclosure is not limited to such engines, however, and may be applicable over a wide range of thrust class and engine designs, including, for example, wide body engines. In some examples, the engine may include, but is not limited to, business jet propulsion engines, small turbofan engines, open rotor engines, marine and industrial turbine engines, including portable power generation units, and marine propulsion for ships.

TABLE 1

| Embodiments | Power (kHP) | $V_G$ (in^3) | $V_{GB}$ (in^3) | LEVR |
|---|---|---|---|---|
| 1 | 20-30 | 253 | 5601 | .045 |
| 2 | 17 | 37 | 691 | .054 |

As the gearbox power, and, thus, the gearbox size/volume increases, the gutter volume also must increase to ensure proper function of the gutter. However, the relationship between LEVR and gearbox (fan) power is not linear. Furthermore, different gearbox configurations like planetary and differential could require more lubricant flow due to the lower efficiency compared to a star gearbox configuration. Therefore, these higher power gearboxes with different operating configurations could yield LEVR nearing 0.3. Accordingly, for star gearbox configurations, Table 1 shows this relationship.

Accordingly, the gutter volume is critical to minimizing the lubricant scavenge losses as the lubricant exits the gearbox and is redirected to the scavenge port of the gutter.

Therefore, the present disclosure defines a lubricant extraction volume ratio that improves or maintains gearbox efficiency, while ensuring the gutter provided with the gearbox is not oversized or undersized with respect to the needs of the gearbox. By maintaining the gutter within the range defined by the lubricant extraction volume ratio, scavenge flow collection is maximized and the negative effects of the gutter (e.g., added weight and size to the system) that may contribute to a reduction in gearbox efficiency are minimized.

Further aspects of the present disclosure are provided by the subject matter of the following clauses.

According to an aspect of the present disclosure, a gearbox assembly comprises a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gearbox assembly of the preceding clause, wherein the lubricant extraction volume ratio is between 0.03 and 0.3, inclusive of the endpoints, for a gearbox power less than or equal to thirty-five kHP.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gutter volume is defined by an inner surface of a gutter wall of the gutter.

The gearbox assembly of any preceding clause, wherein the gearbox volume is defined by an outer diameter of the gearbox and a gearbox length of the gearbox.

The gearbox assembly of any preceding clause, wherein the outer diameter of the gearbox is an outer diameter of a ring gear.

The gearbox assembly of any preceding clause, wherein the gearbox length is defined between a forwardmost end of a gear of the gearbox and an aftmost end of the gear.

The gearbox assembly of any preceding clause, wherein the gearbox includes a sun gear, a plurality of planet gears, and a ring gear.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gearbox volume is defined by an outer diameter of the ring gear and a length of the gearbox.

The gearbox assembly of any preceding clause, wherein the lubricant extraction volume ratio is defined by a power factor, a flow transition time, and a heat density parameter.

The gearbox assembly of any preceding clause, wherein the flow transition time is defined by a gutter volume of the gutter and a lubricant volumetric flow rate of a lubricant through the gearbox.

The gearbox assembly of any preceding clause, wherein the flow transition time is between 1.5 seconds and eleven seconds, inclusive of the endpoints.

The gearbox assembly of any preceding clause, wherein the power factor is defined by a power density of the gearbox and an efficiency of the gearbox.

The gearbox assembly of any preceding clause, wherein the power density is between fifteen thousand hp/ft$^3$ and forty-five thousand hp/ft$^3$, inclusive of the endpoints, and the efficiency is between 99.2 percent and 99.8 percent, inclusive of the endpoints.

The gearbox assembly of any preceding clause, wherein the gearbox includes a sun gear, a plurality of planet gears, and a ring gear, and wherein the gutter circumscribes the ring gear.

The gearbox assembly of any preceding clause, wherein the gutter wholly circumscribes the ring gear.

The gearbox assembly of any preceding clause, wherein the gutter partially circumscribes the ring gear.

The gearbox assembly of any preceding clause, wherein the gutter is located radially outward of the gearbox.

The gearbox assembly of any preceding clause, wherein the gutter further comprises a scavenge port located near a bottom of the gutter.

The gearbox assembly of any preceding clause, wherein the gearbox is a star configuration.

The gearbox assembly of any preceding clause, wherein the gearbox is a planetary configuration.

The gearbox assembly of any preceding clause, wherein the gearbox is a differential gearbox.

The gearbox assembly of any preceding clause, wherein the gearbox volume is between eight hundred in$^3$ and two thousand in$^3$, inclusive of the endpoints, when the engine power is between eighteen kHP and thirty-five kHP, inclusive of the endpoints.

The gearbox assembly of any preceding clause, wherein the gutter volume is between 0.01 and 0.3 times, inclusive of the endpoints, the gearbox volume.

According to an aspect of the present disclosure, a gas turbine engine comprises a gearbox assembly comprising a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gas turbine engine of any preceding clause, wherein the lubricant extraction volume ratio is between 0.01 and 0.3, inclusive of the endpoints, when the gas turbine engine has an engine power greater than or equal to thirty-five kHP.

The gas turbine engine of any preceding clause, wherein the engine power is between thirty-five kHP and ninety kHP, inclusive of the endpoints.

The gas turbine engine of any preceding clause, wherein the lubricant extraction volume ratio is between 0.03 and 0.3, inclusive of the endpoints.

The gas turbine engine of any preceding clause, wherein the lubricant extraction volume ratio is between 0.03 and 0.3, inclusive of the endpoints, when the gas turbine engine has an engine power less than or equal to thirty-five kHP.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gutter volume is defined by an inner surface of a gutter wall of the gutter.

The gas turbine engine of any preceding clause, wherein the gearbox volume is defined by an outer diameter of the gearbox and a gearbox length of the gearbox.

The gas turbine engine of any preceding clause, wherein the outer diameter of the gearbox is an outer diameter of a ring gear.

The gas turbine engine of any preceding clause, wherein the gearbox length is defined between a forwardmost end of a gear of the gearbox and an aftmost end of the gear.

The gas turbine engine of any preceding clause, wherein the gearbox includes a sun gear, a plurality of planet gears, and a ring gear.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gearbox volume is defined by an outer diameter of the ring gear and a length of the gearbox.

The gas turbine engine of any preceding clause, wherein the lubricant extraction volume ratio is defined by a power factor, a flow transition time, and a heat density parameter.

The gas turbine engine of any preceding clause, wherein the power factor is defined by a power density of the gearbox and an efficiency of the gearbox.

The gas turbine engine of any preceding clause, wherein the power density is between fifteen thousand hp/ft$^3$ and forty-five thousand hp/ft$^3$, inclusive of the endpoints, and the efficiency is between 99.2 percent and 99.8 percent, inclusive of the endpoints.

The gas turbine engine of any preceding clause, wherein the flow transition time is defined by a gutter volume of the gutter and a lubricant volumetric flow rate of a lubricant through the gearbox.

The gas turbine engine of any preceding clause, wherein the flow transition time is between 1.5 seconds and eleven seconds, inclusive of the endpoints.

The gas turbine engine of any preceding clause, wherein the gearbox includes a sun gear, a plurality of planet gears, and a ring gear, and wherein the gutter circumscribes the ring gear.

The gas turbine engine of any preceding clause, wherein the gutter wholly circumscribes the ring gear.

The gas turbine engine of any preceding clause, wherein the gutter partially circumscribes the ring gear.

The gas turbine engine of any preceding clause, wherein the gutter is located radially outward of the gearbox.

The gas turbine engine of any preceding clause, wherein the gutter further comprises a scavenge port located near a bottom of the gutter.

The gas turbine engine of any preceding clause, wherein the gearbox is a star configuration.

The gas turbine engine of any preceding clause, wherein the gearbox is a planetary configuration.

The gas turbine engine of any preceding clause, wherein the gearbox is a differential gearbox.

The gas turbine engine of any preceding clause, wherein the gearbox volume is between eight hundred $in^3$ and two thousand $in^3$, inclusive of the endpoints, when the engine power is between eighteen kHP and thirty-five kHP, inclusive of the endpoints.

The gas turbine engine of any preceding clause, wherein the gutter volume is between 0.01 and 0.3 times, inclusive of the endpoints, the gearbox volume.

A gas turbine engine comprises a fan shaft coupled to a fan, a combustor positioned in a core air flowpath that combusts compressed air and fuel to generate combustion gases, a turbine positioned downstream of the combustor to receive the combustion gases and to rotate the turbine, the turbine having a core shaft being drivingly coupled fan shaft to rotate the fan, a steam system that extracts water from the combustion gases, vaporizes the water to generate steam, and injects the steam into the core air flowpath, the steam system comprising one or more water storage devices that store the water therein prior to the water vaporizing to generate the steam, the one or more water storage devices including a first state in which the one or more water storage devices increase or maintain a level of the water in the one or more water storage devices as the water flows through the one or more water storage devices, and a second state in which the one or more water storage devices decrease the level of the water in the one or more water storage devices as the water flows through the one or more water storage devices, and a gearbox assembly comprising a gearbox, the fan shaft being drivingly coupled to the core shaft through the gearbox, the gearbox having a gearbox volume defined by an outer diameter of the gearbox and a gearbox length of the gearbox, and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by $$\frac{V_G}{V_{GB}},$$

$V_G$ being the gutter volume of the gutter and $V_{GB}$ is the gearbox volume.

The gas turbine engine of any preceding clause, the first state of the one or more water storage devices being during steady state operating conditions of the gas turbine engine.

The gas turbine engine of any preceding clause, the second state of the one or more water storage devices being during transient operating conditions of the gas turbine engine.

The gas turbine engine of any preceding clause, the one or more water storage devices including an adjustable diaphragm that moves up or moves down to adjust a maximum water level in the one or more water storage devices.

The gas turbine engine of any preceding clause, the one or more water storage devices including an overflow drain such that the water fills to the overflow drain and drains from the one or more water storage devices through the overflow drain to maintain the level of the water at a maximum water level during the first state of the one or more water storage devices.

The gas turbine engine of any preceding clause, further comprising a fan bypass nozzle and one or more core exhaust nozzles, the overflow drain being in fluid communication with at least one of the fan bypass nozzle or the one or more core exhaust nozzles such that the water drains from the one or more water storage devices through the at least one of the fan bypass nozzle or the one or more core exhaust nozzles and out of the turbine engine.

The gas turbine engine of any preceding clause, the steam system further comprising one or more drain valves that open during a shutdown of the gas turbine engine to drain the water from the steam system during the shutdown.

The gas turbine engine of any preceding clause, the steam system further comprising one or more vents that open during the shutdown of the gas turbine engine to vent the steam system as the water drains through the one or more drain valves during the shutdown.

The gas turbine engine of any preceding clause, the steam system comprising a condenser that condenses the water from the combustion gases and a boiler that vaporizes the water to generate the steam, the water flowing from the condenser to the one or more water storage devices and from the one or more water storage devices to the boiler.

The gas turbine engine of any preceding clause, the boiler being in fluid communication with the core air flowpath such that the combustion gases flow through the boiler and vaporize the water to generate the steam.

The gas turbine engine of any preceding clause, further comprising a water separator positioned downstream of the condenser, the water separator separating the water from the combustion gases.

The gas turbine engine of any preceding clause, further comprising a water pump in fluid communication with the one or more water storage devices and with the boiler to induce the flow of the water from the one or more water storage devices to the boiler.

The gas turbine engine of any preceding clause, the steam system further including a steam turbine that receives the steam to rotate the steam turbine, the steam turbine being drivingly coupled to the core shaft to rotate the core shaft when the steam turbine rotates.

The gas turbine engine of any preceding clause, the steam turbine receiving the steam from the boiler.

The gas turbine engine of any preceding clause, further comprising a bypass airflow passage, bypass air flowing through the bypass airflow passage and core air flows through the core air flowpath, the condenser being positioned downstream of the boiler and in the bypass airflow passage for the bypass air to cool the combustion gases and to condense the water from the combustion gases.

The gas turbine engine of any preceding clause, the one or more water storage devices being positioned downstream of the condenser to receive the water from the condenser and to supply the water to the boiler.

The gas turbine engine of any preceding clause, a bypass ratio of the bypass air to the core air being in a range of 18:1 to 100:1.

A gas turbine engine comprises a fan shaft coupled to a fan, a combustor positioned in a core air flowpath that combusts compressed air and fuel to generate combustion gases, a turbine positioned downstream of the combustor to receive the combustion gases and to rotate the turbine, the turbine having a core shaft being drivingly coupled fan shaft to rotate the fan, a steam system that extracts water from the combustion gases, vaporizes the water to generate steam, and injects the steam into the core air flowpath, the steam system comprising one or more water storage devices that store the water therein prior to the water vaporizing to generate the steam, the one or more water storage devices including a first state in which the one or more water storage devices increase or maintain a level of the water in the one or more water storage devices as the water flows through the one or more water storage devices, and a second state in which the one or more water storage devices decrease the level of the water in the one or more water storage devices as the water flows through the one or more water storage devices, the first state being during steady state operating conditions of the gas turbine engine and the second state is during transient operating conditions of the gas turbine engine, and the one or more water storage devices include an overflow drain such that the water fills to the overflow drain and drains from the one or more water storage devices through the overflow drain to maintain the level of the water at a maximum water level during the first state of the one or more water storage devices, and a gearbox assembly comprising a gearbox, the fan shaft being drivingly coupled to the core shaft through the gearbox, the gearbox having a gearbox volume defined by an outer diameter of the gearbox and a gearbox length of the gearbox, and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by $$\frac{V_G}{V_{GB}},$$

$V_G$ being the gutter volume of the gutter and $V_{GB}$ is the gearbox volume.

The gas turbine engine of any preceding clause, the steam system comprising a condenser that condenses the water from the combustion gases, a boiler that vaporizes the water to generate the steam, a water separator positioned downstream of the condenser, and a water pump in fluid communication with the one or more water storage devices and with the boiler to induce the flow of the water from the one or more water storage devices to the boiler, the water flowing from the condenser to the one or more water storage devices and from the one or more water storage devices to the boiler, and the water separator separating the water from the combustion gases.

The gas turbine engine of any preceding clause, the steam system further including a steam turbine that receives the steam from the boiler to rotate the steam turbine, the steam turbine being drivingly coupled to the core shaft to rotate the core shaft when the steam turbine rotates.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A gas turbine engine comprising:
   a fan shaft coupled to a fan;
   a combustor positioned in a core air flowpath that combusts compressed air and fuel to generate combustion gases;
   a turbine positioned downstream of the combustor to receive the combustion gases and to rotate the turbine, the turbine having a core shaft being drivingly coupled to the fan shaft to rotate the fan;
   a steam system that extracts water from the combustion gases, vaporizes the water to generate steam, and injects the steam into the core air flowpath, the steam system comprising one or more water storage devices that store the water therein prior to the water vaporizing to generate the steam, the one or more water storage devices including a first state in which the one or more water storage devices increase or maintain a level of the water in the one or more water storage devices as the water flows through the one or more water storage devices, and a second state in which the one or more water storage devices decrease the level of the water in the one or more water storage devices as the water flows through the one or more water storage devices; and
   a gearbox assembly comprising:
      a gearbox, the fan shaft being drivingly coupled to the core shaft through the gearbox, the gearbox having a gearbox volume defined by an outer diameter of the gearbox and a gearbox length of the gearbox; and
      a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, for a maximum gearbox power greater than 35 kHP and less than or equal to 90 kHP, and the lubrication extraction volume ratio is between 0.03 to 0.3, inclusive of the endpoints, for a maximum gearbox power less than 35 kHP, the lubricant extraction volume ratio defined by:

$$\frac{V_G}{V_{GB}},$$

wherein $V_G$ is the gutter volume of the gutter and $V_{GB}$ is the gearbox volume.

2. The gas turbine engine of claim 1, wherein the first state of the one or more water storage devices is during steady state operating conditions of the gas turbine engine.

3. The gas turbine engine of claim 1, wherein the second state of the one or more water storage devices is during transient operating conditions of the gas turbine engine.

4. The gas turbine engine of claim 1, wherein the one or more water storage devices include an adjustable diaphragm that moves up or moves down to adjust a maximum water level in the one or more water storage devices.

5. The gas turbine engine of claim 1, wherein the one or more water storage devices include an overflow drain such that the water fills to the overflow drain and drains from the one or more water storage devices through the overflow drain to maintain the level of the water at a maximum water level during the first state of the one or more water storage devices.

6. The gas turbine engine of claim 5, further comprising a fan bypass nozzle and one or more core exhaust nozzles, wherein the overflow drain is in fluid communication with at least one of the fan bypass nozzle or the one or more core exhaust nozzles such that the water drains from the one or more water storage devices through the at least one of the fan bypass nozzle or the one or more core exhaust nozzles and out of the turbine engine.

7. The gas turbine engine of claim 1, wherein the steam system further comprises one or more drain valves that open during a shutdown of the gas turbine engine to drain the water from the steam system during the shutdown.

8. The gas turbine engine of claim 7, wherein the steam system further comprises one or more vents that open during the shutdown of the gas turbine engine to vent the steam system as the water drains through the one or more drain valves during the shutdown.

9. The gas turbine engine of claim 1, wherein the steam system comprises a condenser that condenses the water from the combustion gases and a boiler that vaporizes the water to generate the steam, the water flowing from the condenser to the one or more water storage devices and from the one or more water storage devices to the boiler.

10. The gas turbine engine of claim 9, wherein the boiler is in fluid communication with the core air flowpath such that the combustion gases flow through the boiler and vaporize the water to generate the steam.

11. The gas turbine engine of claim 9, further comprising a water separator positioned downstream of the condenser, the water separator separating the water from the combustion gases.

12. The gas turbine engine of claim 9, further comprising a water pump in fluid communication with the one or more water storage devices and with the boiler to induce the flow of the water from the one or more water storage devices to the boiler.

13. The gas turbine engine of claim 9, wherein the steam system further includes a steam turbine that receives the steam to rotate the steam turbine, the steam turbine being drivingly coupled to the core shaft to rotate the core shaft when the steam turbine rotates.

14. The gas turbine engine of claim 13, wherein the steam turbine receives the steam from the boiler.

15. The gas turbine engine of claim 9, further comprising a bypass airflow passage, wherein bypass air flows through the bypass airflow passage and core air flows through the core air flowpath, the condenser being positioned downstream of the boiler and in the bypass airflow passage for the bypass air to cool the combustion gases and to condense the water from the combustion gases.

16. The gas turbine engine of claim 15, wherein the one or more water storage devices are positioned downstream of the condenser to receive the water from the condenser and to supply the water to the boiler.

17. The gas turbine engine of claim 15, wherein a bypass ratio of the bypass air to the core air is in a range of 18:1 to 100:1.

18. A gas turbine engine comprising:
a fan shaft coupled to a fan;
a combustor positioned in a core air flowpath that combusts compressed air and fuel to generate combustion gases;
a turbine positioned downstream of the combustor to receive the combustion gases and to rotate the turbine, the turbine having a core shaft being drivingly coupled to the fan shaft to rotate the fan;
a steam system that extracts water from the combustion gases, vaporizes the water to generate steam, and injects the steam into the core air flowpath, the steam system comprising one or more water storage devices that store the water therein prior to the water vaporizing to generate the steam, the one or more water storage devices including a first state in which the one or more water storage devices increase or maintain a level of the water in the one or more water storage devices as the water flows through the one or more water storage devices, and a second state in which the one or more water storage devices decrease the level of the water in the one or more water storage devices as the water flows through the one or more water storage devices, wherein the first state is during steady state operating conditions of the gas turbine engine and the second state is during transient operating conditions of the gas turbine engine, and the one or more water storage devices include an overflow drain such that the water fills to the overflow drain and drains from the one or more water storage devices through the overflow drain to maintain the level of the water at a maximum water level during the first state of the one or more water storage devices; and
a gearbox assembly comprising:
a gearbox, the fan shaft being drivingly coupled to the core shaft through the gearbox, the gearbox having a gearbox volume defined by an outer diameter of the gearbox and a gearbox length of the gearbox; and
a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, for a maximum gearbox power greater than 35 kHP and less than or equal to 90 kHP, and the lubrication extraction volume ratio is between 0.03 to 0.3, inclusive of the endpoints, for a maximum gearbox power less than 35 kHP, the lubricant extraction volume ratio defined by:

$$\frac{V_G}{V_{GB}},$$

wherein $V_G$ is the gutter volume of the gutter and $V_{GB}$ is the gearbox volume.

19. The gas turbine engine of claim 18, wherein the steam system comprises a condenser that condenses the water from the combustion gases, a boiler that vaporizes the water to generate the steam, a water separator positioned downstream of the condenser, and a water pump in fluid communication with the one or more water storage devices and with the boiler to induce the flow of the water from the one or more water storage devices to the boiler, the water flowing from the condenser to the one or more water storage devices and from the one or more water storage devices to the boiler, and the water separator separating the water from the combustion gases.

20. The gas turbine engine of claim 19, wherein the steam system further includes a steam turbine that receives the steam from the boiler to rotate the steam turbine, the steam turbine being drivingly coupled to the core shaft to rotate the core shaft when the steam turbine rotates.

\* \* \* \* \*